US010680871B2

(12) United States Patent
Zeng et al.

(10) Patent No.: US 10,680,871 B2
(45) Date of Patent: Jun. 9, 2020

(54) UPLINK SUBCARRIER SPACING INDICATION METHOD, BASE STATION, AND TERMINAL

(71) Applicant: HUAWEI TECHNOLOGIES CO., LTD., Shenzhen, Guangdong (CN)

(72) Inventors: Yongbo Zeng, Beijing (CN); Yanliang Sun, Beijing (CN); Guorong Li, Shenzhen (CN); Yu Cai, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/075,429

(22) PCT Filed: Feb. 5, 2016

(86) PCT No.: PCT/CN2016/073639
§ 371 (c)(1),
(2) Date: Aug. 3, 2018

(87) PCT Pub. No.: WO2017/132985
PCT Pub. Date: Aug. 10, 2017

(65) Prior Publication Data
US 2019/0044782 A1 Feb. 7, 2019

(51) Int. Cl.
*H04L 27/26* (2006.01)
*H04L 5/00* (2006.01)
(Continued)

(52) U.S. Cl.
CPC ........ *H04L 27/2666* (2013.01); *H04L 5/0007* (2013.01); *H04L 5/0044* (2013.01);
(Continued)

(58) Field of Classification Search
CPC ............. H04L 27/2602; H04L 27/2613; H04L 27/2666; H04L 5/0044; H04L 5/0048;
(Continued)

(56) References Cited

U.S. PATENT DOCUMENTS

2008/0205351 A1 8/2008 Lindoff et al.
2015/0003427 A1 1/2015 Wan et al.
(Continued)

FOREIGN PATENT DOCUMENTS

CN 101636992 A 1/2010
CN 102263729 A 11/2011
(Continued)

OTHER PUBLICATIONS

3GPP TS 36.213 V13.0.1 (Jan. 2016),3rd Generation Partnership Project;Technical Specification Group Radio Access Network;Evolved Universal Terrestrial Radio Access (E-UTRA);Physical layer procedures(Release 13),dated Jan. 2016,total 326 pages.
(Continued)

*Primary Examiner* — Ayaz R Sheikh
*Assistant Examiner* — Debebe A Asefa
(74) *Attorney, Agent, or Firm* — Fish & Richardson P.C.

(57) ABSTRACT

Embodiments of the present invention provide an uplink subcarrier spacing indication method, a base station, and a terminal. The base station determines indication information that is used to indicate a first uplink subcarrier spacing supported by the base station, and communicates with the terminal according to the indication information. During the communication, the base station indicates the first uplink subcarrier spacing supported by the base station to the terminal, so that the terminal subsequently determines, based on the first uplink subcarrier spacing, a second uplink subcarrier spacing supported by the terminal; or the base station receives information that is sent by the terminal and that carries a second uplink subcarrier spacing, in other words, receives an indication from the terminal, so as to learn of the second uplink subcarrier spacing supported by the terminal or to be used by the terminal to send an uplink signal.

20 Claims, 8 Drawing Sheets

(51) Int. Cl.
 *H04W 8/22* (2009.01)
 *H04W 72/04* (2009.01)
 *H04W 74/08* (2009.01)

(52) U.S. Cl.
 CPC .......... *H04L 5/0048* (2013.01); *H04L 5/0092* (2013.01); *H04L 27/2602* (2013.01); *H04L 27/2613* (2013.01); *H04W 8/22* (2013.01); *H04W 72/0413* (2013.01); *H04W 72/0446* (2013.01); *H04W 74/0833* (2013.01)

(58) Field of Classification Search
 CPC ......... H04W 72/0413; H04W 72/0446; H04W 74/0833; H04W 8/22
 See application file for complete search history.

(56) References Cited

U.S. PATENT DOCUMENTS

| | | | |
|---|---|---|---|
| 2015/0256308 | A1 | 9/2015 | Ma et al. |
| 2017/0070994 | A1* | 3/2017 | Rico Alvarino ........ H04W 4/70 |
| 2017/0094686 | A1* | 3/2017 | Ramamurthi ..... H04W 74/0833 |
| 2018/0098298 | A1* | 4/2018 | Jung ..................... H04L 27/266 |

FOREIGN PATENT DOCUMENTS

| | | |
|---|---|---|
| CN | 104813728 A | 7/2015 |
| JP | 2015508971 A | 3/2015 |
| JP | 2017513421 A | 5/2017 |
| WO | 2015042940 A1 | 4/2015 |
| WO | 2015131827 A1 | 9/2015 |

OTHER PUBLICATIONS

3GPP TS 36300 V13.2.0 (Dec. 2015),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),dated Dec. 2015,total 290 pages.

3GPP TS 36321 V13.0.0 (Dec. 2015),3rd Generation Partnership Project;Technical Specification Group Radio Access Network;Evolved Universal Terrestrial Radio Access (E-UTRA);Medium Access Control (MAC) protocol specification (Release 13),dated Dec. 2015,total 82 pages.

3GPP TS 36.211 V13.0.0 (Dec. 2015),3rd Generation Partnership Project;Technical Specification Group Radio Access Network;Evolved Universal Terrestrial Radio Access (E-UTRA);Physical channels and modulation(Release 13),dated Dec. 2015,total 141 pages.

3GPP TR 45.820 V13.1.0 (Nov. 2015),3rd Generation Partnership Project;Technical Specification Group GSM/EDGE Radio Access Network;Cellular system support for ultra-low complexity and low throughput Internet of Things (CIoT) (Release 13),total 495 pages.

R1-157497 Qualcomm Incorporated,"Random access design",3GPP TSG RAN WG1 #83,Anaheim, USA, Nov. 15-22, 2015,total 3 pages.

R1-156479 Neul, Huawei, HiSilicon,"On the RACH design for SC-FDMA uplink",3GPP TSG RAN WG1 Meeting #83, Anaheim, USA, Nov. 15-22, 2015,total 13 pages.

RP-152299 Matthew Webb,"LS on NB-IoT ",3GPP TSG RAN meeting #70,Sitges, Spain, Dec. 7-10, 2015,total 1 pages.

R1-156628 ZTE,"Random Access Design of NB-IoT",3GPP TSG RAN WG1 Meeting #83,Anaheim, USA, Nov. 15-22, 2015,total 4 pages.

International Search Report and Written Opinion issued in International Application No. PCT/CN2016/073639 dated Oct. 28, 2016, 15 pages.

Office Action issued in Japanese Application No. 2018-540471 dated Jun. 4, 2019, 6 pages.

R1-160178—Sony, "Considerations on NB-PUSCH in NB-IoT," 3GPP TSG RAN WG1 NB-IoT Ad-Hoc Meeting, Budapest, Hungary, Jan. 18-20, 2016, 4 pages.

R1-160035—Huawei, HiSilicon, "Further NB-IoT random access physical layer aspects," 3GPP TSG RAN WG1 NB-IoT Ad-Hoc Meeting, Budapest, Hungary, Jan. 18-20, 2016, 3 pages.

Office Action issued in Chinese Application No. 201680079202.7 dated Mar. 3, 2020, 7 pages.

\* cited by examiner

UPLINK SUBCARRIER SPACING INDICATION METHOD, BASE STATION, AND TERMINAL

CROSS-REFERENCE TO RELATED APPLICATIONS

This application is a national stage of International Application No. PCT/CN2016/073639, filed on Feb. 5, 2016, which is hereby incorporated by reference in its entirety.

TECHNICAL FIELD

Embodiments of the present invention relate to the communications field, and in particular, to an uplink subcarrier spacing indication method, a base station, and a terminal.

BACKGROUND

Narrowband Internet of Things (Narrowband Internet of Things, NB-IoT) communication is characterized by a low data rate, low latency sensitivity, low complexity, a large quantity of terminals (User Equipment, UE), and the like. Two uplink transmission modes are defined in NB-IoT: single-tone transmission (single-tone transmission) and multi-tone transmission (multi-tone transmission). In single-tone transmission, two types of subcarrier spacings are used: 3.75 kHz and 15 kHz. In multi-tone transmission, a 15 kHz subcarrier spacing is used.

In a Long Term Evolution (Long Term Evolution, LTE) or LTE-advanced (LTE-Advanced, LTE-A) system, a 15 kHz subcarrier spacing is used in both single-tone transmission and multi-tone transmission. In other words, LTE/LTE-A supports only one type of uplink subcarrier spacing.

A subcarrier spacing is a basic parameter in a communications system. In LTE and LTE-A, because only one type of uplink subcarrier spacing is defined for data transmission, an eNodeB and a terminal do not need to indicate their respective supported uplink subcarrier spacings to each other. However, in an NB-IoT system, because two types of subcarrier spacings are defined for single-tone transmission, if an uplink subcarrier spacing used by UE is inconsistent with a subcarrier spacing supported by a base station, the base station cannot correctly demodulate an uplink signal of the terminal.

SUMMARY

Embodiments of the present invention provide an uplink subcarrier spacing indication method, a base station, and a terminal. The base station and the terminal indicate their respective supported uplink subcarrier spacings to each other, so that the base station can correctly demodulate an uplink signal sent by the terminal.

According to a first aspect, an embodiment of the present invention provides an uplink subcarrier spacing indication method, including:

determining, by a base station, indication information that is used to indicate a first uplink subcarrier spacing, where the first uplink subcarrier spacing is an uplink subcarrier spacing supported by the base station; and communicating, by the base station, with a terminal according to the indication information.

According to the uplink subcarrier spacing indication method provided in this embodiment of the present invention, the base station determines the indication information that is used to indicate the first uplink subcarrier spacing supported by the base station, and communicates with the terminal according to the indication information. During the communication, the base station indicates the first uplink subcarrier spacing supported by the base station to the terminal, or the terminal indicates a second uplink subcarrier spacing supported by the terminal to the base station, so that the terminal uses an appropriate uplink subcarrier spacing to send an uplink signal in a subsequent uplink signal sending process, and the base station can correctly demodulate the uplink signal sent by the terminal.

Optionally, the determining, by a base station, indication information includes:

classifying, by the base station, physical random access preamble sequences into at least two groups, where each group corresponds to one type of uplink subcarrier spacing, the indication information includes group information of a physical random access preamble sequence corresponding to a first group in the at least two groups, and the first group is a group corresponding to the first uplink subcarrier spacing; or classifying, by the base station, physical random access preamble sequences into at least three groups, where each group corresponds to a combination of one type of uplink subcarrier spacing and an uplink transmission mode, the indication information includes group information of a physical random access preamble sequence corresponding to a first group in the at least three groups, the first group is a group corresponding to a combination of the first uplink subcarrier spacing and an uplink transmission mode, and the uplink transmission mode includes single-tone transmission or multi-tone transmission.

According to the uplink subcarrier spacing indication method provided in this embodiment of the present invention, the base station implicitly indicates, by using different random access preamble sequence groups, the first uplink subcarrier spacing supported by the base station or to be used by the base station, and communicates with the terminal according to the indication information. During the communication, the base station indicates the first uplink subcarrier spacing supported by the base station to the terminal, or the terminal indicates a second uplink subcarrier spacing supported by the terminal to the base station, so that the terminal uses an appropriate uplink subcarrier spacing to send an uplink signal in a subsequent uplink signal sending process, and the base station can correctly demodulate the uplink signal sent by the terminal.

Optionally, the determining, by a base station, indication information includes:

classifying, by the base station, PRACH signals in different formats into at least two groups based on PRACH signal formats, where the PRACH signal formats are determined based on at least one of the following parameters: a cyclic prefix CP length of the PRACH signal, a subcarrier spacing of the PRACH signal, and a repetition period of the PRACH signal, each group corresponds to one type of uplink subcarrier spacing, the indication information includes a PRACH signal format corresponding to a first group in the at least two groups, and the first group is a group corresponding to the first uplink subcarrier spacing; or classifying, by the base station, PRACH signals in different formats into at least three groups based on PRACH signal formats, where the PRACH signal formats are determined based on at least one of the following parameters: a cyclic prefix CP length of the PRACH signal, a subcarrier spacing of the PRACH signal, and a repetition period of the PRACH signal, each group corresponds to a combination of one type of uplink subcarrier spacing and an uplink transmission mode, the indication information includes a PRACH signal format corresponding to a first group in the at least three groups, the first group is a group corresponding to a combination of the first uplink subcarrier spacing and an uplink transmission mode, and the uplink transmission mode includes single-tone transmission or multi-tone transmission.

According to the uplink subcarrier spacing indication method provided in this embodiment of the present invention, the base station implicitly indicates, based on the grouping performed based on the PRACH signal formats, the first uplink subcarrier spacing supported by the base station or to be used by the base station, and communicates with the terminal according to the indication information. After sending a random access signal message (Msg.1), the terminal may send a first uplink message (Msg.3) to the base station by using a second uplink subcarrier spacing supported by the terminal. Msg.3 does not need to explicitly indicate the second uplink subcarrier spacing supported by the terminal to the base station, a current Msg.3 format may still be used, and a change to the Msg.3 format is prevented. In addition, in this process, terminals served by a same cell may configure different subcarrier spacings based on requirements of the terminals.

Optionally, the determining, by a base station, indication information includes:

classifying, by the base station, PRACH channel resource pools into at least two resource pools, where each resource pool corresponds to one type of uplink subcarrier spacing, the indication information includes configuration information of a first resource pool in the at least two resource pools, and the first resource pool is a resource pool corresponding to the first uplink subcarrier spacing; or classifying, by the base station, PRACH channel resource pools into at least three resource pools, where each resource pool corresponds to a combination of one type of uplink subcarrier spacing and an uplink transmission mode, the indication information includes configuration information of a first resource pool in the at least three resource pools, the first resource pool is a resource pool corresponding to a combination of the first uplink subcarrier spacing and an uplink transmission mode, and the uplink transmission mode includes single-tone transmission or multi-tone transmission.

According to the uplink subcarrier spacing indication method provided in this embodiment of the present invention, the base station implicitly indicates, based on the grouping of the PRACH channel resource pools, the first uplink subcarrier spacing supported by the base station or to be used by the base station, and communicates with the terminal according to the indication information. During the communication, after sending a random access signal message (Msg.1), the terminal may send a first uplink message (Msg.3) to the base station by using a second uplink subcarrier spacing supported by the terminal, Msg.3 does not need to explicitly indicate the second uplink subcarrier spacing supported by the terminal to the base station, a current Msg.3 format may still be used, and a change to the Msg.3 format is prevented. In addition, in this process, terminals served by a same cell may configure different subcarrier spacings based on requirements of the terminals. In addition, in this embodiment, one PRACH channel resource pool is multiplexed as a plurality of PRACH channel resource pools. Therefore, more terminals can access the PRACH channel resource pool, and a probability of random access conflicts is reduced, so that the indication information sent by the base station is more reliable.

Optionally, the determining, by a base station, indication information includes:

configuring, by the base station, a correspondence between an operation mode and an uplink subcarrier spacing, where the indication information includes an operation mode corresponding to the first uplink subcarrier spacing; or configuring, by the base station, a correspondence between an operation mode and a combination manner, where the combination manner is a combination of an uplink subcarrier spacing and an uplink transmission mode, the uplink transmission mode includes single-tone transmission or multi-tone transmission, and the indication information includes an operation mode corresponding to a combination of the first uplink subcarrier spacing and an uplink transmission mode.

According to the uplink subcarrier spacing indication method provided in this embodiment of the present invention, in a system information broadcast process, the base station implicitly indicates, by using an operation mode, the first uplink subcarrier spacing supported by the base station or to be used by the base station. During the communication, the terminal does not need to explicitly indicate, in Msg.3, a second uplink subcarrier spacing supported by the terminal to the base station. Therefore, a bit in Msg.3 is saved.

Optionally, the communicating, by the base station, with a terminal according to the indication information includes:

sending, by the base station, the indication information to the terminal.

According to the uplink subcarrier spacing indication method provided in this embodiment of the present invention, the base station determines the indication information that is used to indicate the first uplink subcarrier spacing supported by the base station, and communicates with the terminal according to the indication information. During the communication, the base station indicates the first uplink subcarrier spacing supported by the base station to the terminal, so that the terminal uses an appropriate uplink subcarrier spacing to send an uplink signal in a subsequent uplink signal sending process, and the base station can correctly demodulate the uplink signal sent by the terminal.

Optionally, the communicating, by the base station, with a terminal according to the indication information includes:

determining, by the base station according to the indication information, that the base station supports at least one first uplink subcarrier spacing; and receiving, by the base station, a scheduling transmission message that is sent by the terminal and carries a second uplink subcarrier spacing, where the second uplink subcarrier spacing is an uplink subcarrier spacing supported by the terminal and is one of the at least one first uplink subcarrier spacing.

According to the uplink subcarrier spacing indication method provided in this embodiment of the present invention, the base station determines, according to the indication information, that the base station supports at least one first uplink subcarrier spacing. In the process of communicating with the base station, the terminal explicitly indicates, in Msg.3, the second uplink subcarrier spacing supported by the terminal. This is suitable for the base station to perform management and control.

Optionally, the communicating, by the base station, with a terminal according to the indication information includes:

determining, by the base station according to the indication information, that the base station supports at least one first uplink subcarrier spacing; and receiving, by the base station, a terminal category message that is sent by the terminal and carries a second uplink subcarrier spacing, where the second uplink subcarrier spacing is an uplink subcarrier spacing supported by the terminal and is one of the at least one first uplink subcarrier spacing.

According to the uplink subcarrier spacing indication method provided in this embodiment of the present invention, the base station determines, according to the indication information, that the base station supports at least one first uplink subcarrier spacing. The terminal also supports at least one first uplink subcarrier spacing. When the terminal needs to adjust an uplink subcarrier spacing, the terminal may indicate, in the UE category message, the second uplink subcarrier spacing supported by the terminal to the base station after a random access process. In this process, the terminal does not need to explicitly indicate, in Msg.3, the second uplink subcarrier spacing supported by the terminal to the base station. Therefore, a bit in Msg.3 is saved.

Optionally, the communicating, by the base station, with a terminal according to the indication information includes:

determining, by the base station according to the indication information, that the base station supports at least one first uplink subcarrier spacing;

determining, by the base station, a second uplink subcarrier spacing, where the second uplink subcarrier spacing is an uplink subcarrier spacing supported by the terminal and is one of the at least one first uplink subcarrier spacing; and sending, by the base station to the terminal, a radio resource control RRC message carrying the second uplink subcarrier spacing.

According to the uplink subcarrier spacing indication method provided in this embodiment of the present invention, the base station may indicate the first uplink subcarrier spacing supported by the base station to the terminal by using radio resource control (Radio Resource Control, RRC) signaling after a random access process of the terminal. In this process, the terminal does not need to explicitly indicate, in Msg.3, the second uplink subcarrier spacing supported by the terminal to the base station. Therefore, a bit in Msg.3 is saved.

Optionally, the determining, by a base station, indication information includes: determining, by the base station, the indication information based on a default configuration, where the default configuration is classifying synchronization signals into at least two groups, the synchronization signals include a primary synchronization signal and/or a secondary synchronization signal, each group corresponds to one type of uplink subcarrier spacing, the indication information includes a synchronization signal corresponding to a first group in the at least two groups, and the first group is a group corresponding to the first uplink subcarrier spacing; or the determining, by a base station, indication information includes: determining, by the base station, the indication information based on a default configuration, where the default configuration is classifying synchronization signals into at least three groups, the synchronization signals include a primary synchronization signal and/or a secondary synchronization signal, each group corresponds to a combination of one type of uplink subcarrier spacing and an uplink transmission mode, the indication information includes a synchronization signal corresponding to a first group in the at least three groups, the first group is a group corresponding to a combination of the first uplink subcarrier spacing and an uplink transmission mode, and the uplink transmission mode includes single-tone transmission or multi-tone transmission; and the communicating, by the base station, with a terminal according to the indication information includes:

sending, by the base station, the synchronization signal corresponding to the first group to the terminal according to the indication information.

According to the uplink subcarrier spacing indication method provided in this embodiment of the present invention, the base station implicitly indicates the first uplink subcarrier spacing by using the synchronization signal. In this process, the terminal does not need to explicitly indicate, in Msg.3, a second uplink subcarrier spacing supported by the terminal to the base station. Therefore, a bit in Msg.3 is saved.

Optionally, the determining, by a base station, indication information includes: determining, by the base station, the indication information based on a default configuration, where the default configuration is classifying different time intervals between two consecutive synchronization signals into at least two groups based on time interval lengths between two consecutive synchronization signals, the synchronization signals include a primary synchronization signal and/or a secondary synchronization signal, each group corresponds to one time interval length, the indication information includes a synchronization signal with a time interval corresponding to a first group in the at least two groups, and the first group is a group corresponding to the first uplink subcarrier spacing; or the determining, by a base station, indication information includes: determining, by the base station, the indication information based on a default configuration, where the default configuration is classifying different time intervals between two consecutive synchronization signals into at least three groups based on time interval lengths between two consecutive synchronization signals, the synchronization signals include a primary synchronization signal and/or a secondary synchronization signal, each group corresponds to a combination of one type of uplink subcarrier spacing and an uplink transmission mode, the indication information includes a synchronization signal with a time interval corresponding to a first group in the at least three groups, the first group is a group corresponding to a combination of the first uplink subcarrier spacing and an uplink transmission mode, and the uplink transmission mode includes single-tone transmission or multi-tone transmission; and the communicating, by the base station, with a terminal according to the indication information includes:

sending, by the base station, the synchronization signal corresponding to the first group to the terminal according to the indication information.

According to the uplink subcarrier spacing indication method provided in this embodiment of the present invention, the base station implicitly indicates the first uplink subcarrier spacing by using the synchronization signal. In this process, the terminal does not need to explicitly indicate, in Msg.3, a second uplink subcarrier spacing supported by the terminal to the base station. Therefore, a bit in Msg.3 is saved.

According to a second aspect, an embodiment of the present invention provides an uplink subcarrier spacing indication method, including:

communicating, by a terminal, with a base station, where the communication is that the base station communicates with the terminal according to indication information, the indication information is used to indicate a first uplink subcarrier spacing, and the first uplink subcarrier spacing is an uplink subcarrier spacing supported by the base station; and performing, by the terminal, processing based on the communication.

The terminal provided in this embodiment of the present invention communicates with the base station and performs the corresponding processing based on the communication. During the communication, the terminal receives the indication information that is used to indicate the first uplink subcarrier spacing and sent by the base station, in other words, receives an indication from the base station; or the terminal indicates a second uplink subcarrier spacing supported by the terminal to the base station, so that the terminal indicates the second uplink subcarrier spacing supported by the terminal to the base station, and the terminal uses an appropriate uplink subcarrier spacing to send an uplink signal in a subsequent uplink signal sending process, thereby ensuring that the base station can correctly demodulate the uplink signal sent by the terminal.

Optionally, the communicating, by a terminal, with a base station includes:

receiving, by the terminal, the indication information sent by the base station, where the indication information includes group information of a physical random access preamble sequence corresponding to a first group when the base station classifies physical random access preamble sequences into at least two groups, and the first group is a group corresponding to the first uplink subcarrier spacing when each of the at least two groups corresponds to one type of uplink subcarrier spacing; or the indication information includes group information of a physical random access preamble sequence corresponding to a first group when the base station classifies physical random access preamble sequences into at least three groups, the first group is a group corresponding to a combination of the first uplink subcarrier spacing and an uplink transmission mode when each of the at least three groups corresponds to a combination of one type of uplink subcarrier spacing and an uplink transmission mode, and the uplink transmission mode includes single-tone transmission or multi-tone transmission.

According to the uplink subcarrier spacing indication method provided in this embodiment of the present invention, the base station implicitly indicates, by using different random access preamble sequence groups, the first uplink subcarrier spacing supported by the base station or to be used by the base station, and communicates with the terminal according to the indication information. During the communication, the base station indicates the first uplink subcarrier spacing supported by the base station to the terminal, or the terminal indicates a second uplink subcarrier spacing supported by the terminal to the base station, so that the terminal uses an appropriate uplink subcarrier spacing to send an uplink signal in a subsequent uplink signal sending process, and the base station can correctly demodulate the uplink signal sent by the terminal.

Optionally, the communicating, by a terminal, with a base station includes:

receiving, by the terminal, the indication information sent by the base station, where the indication information includes a PRACH signal format corresponding to a first group when the base station classifies PRACH signals in different formats into at least two groups based on PRACH signal formats, the PRACH signal formats are determined based on at least one of the following parameters: a cyclic prefix CP length of the PRACH signal, a subcarrier spacing of the PRACH signal, and a repetition period of the PRACH signal, and the first group is a group corresponding to the first uplink subcarrier spacing when each of the at least two groups corresponds to one type of uplink subcarrier spacing; or the indication information includes a PRACH signal format corresponding to a first group when the base station classifies PRACH signals in different formats into at least three groups based on PRACH signal formats, the PRACH signal formats are determined based on at least one of the following parameters: a cyclic prefix CP length of the PRACH signal, a subcarrier spacing of the PRACH signal, and a repetition period of the PRACH signal, the first group is a group corresponding to a combination of the first uplink subcarrier spacing and an uplink transmission mode when each of the at least three groups corresponds to a combination of one type of uplink subcarrier spacing and an uplink transmission mode, and the uplink transmission mode includes single-tone transmission or multi-tone transmission.

According to the uplink subcarrier spacing indication method provided in this embodiment of the present invention, the base station implicitly indicates, based on the grouping performed based on the PRACH signal formats, the first uplink subcarrier spacing supported by the base station or to be used by the base station, and communicates with the terminal according to the indication information. After sending a random access signal message (Msg.1), the terminal may send a first uplink message (Msg.3) to the base station by using a second uplink subcarrier spacing supported by the terminal, Msg.3 does not need to explicitly indicate the second uplink subcarrier spacing supported by the terminal to the base station, a current Msg.3 format may still be used, and a change to the Msg.3 format is prevented. In addition, in this process, terminals served by a same cell may configure different subcarrier spacings based on requirements of the terminals.

Optionally, the communicating, by a terminal, with a base station includes:

receiving, by the terminal, the indication information sent by the base station, where the indication information includes configuration information of a first resource pool when the base station classifies PRACH channel resource pools into at least two resource pools, and the first resource pool is a resource pool corresponding to the first uplink subcarrier spacing when each of the at least two resource pools corresponds to one type of uplink subcarrier spacing; or the indication information includes configuration information of a first resource pool when the base station classifies PRACH channel resource pools into at least three resource pools, the first resource pool is a resource pool corresponding to a combination of the first uplink subcarrier spacing and an uplink transmission mode when each of the at least three resource pools corresponds to a combination of one type of uplink subcarrier spacing and an uplink transmission mode, and the uplink transmission mode includes single-tone transmission or multi-tone transmission.

According to the uplink subcarrier spacing indication method provided in this embodiment of the present invention, the base station implicitly indicates, based on the grouping of the PRACH channel resource pools, the first uplink subcarrier spacing supported by the base station or to be used by the base station, and communicates with the terminal according to the indication information. During the communication, after sending a random access signal message (Msg.1), the terminal may send a first uplink message (Msg.3) to the base station by using a second uplink subcarrier spacing supported by the terminal, Msg.3 does not need to explicitly indicate the second uplink subcarrier spacing supported by the terminal to the base station, a current Msg.3 format may still be used, and a change to the Msg.3 format is prevented. In addition, in this process, terminals served by a same cell may configure different subcarrier spacings based on requirements of the terminals. In addition, in this embodiment, one PRACH channel resource pool is multiplexed as a plurality of PRACH channel resource pools. Therefore, more terminals can access the PRACH channel resource pool, and a probability of random access conflicts is reduced, so that the indication information sent by the base station is more reliable.

Optionally, the communicating, by a terminal, with a base station includes:

receiving, by the terminal, the indication information sent by the base station, where the indication information includes an operation mode corresponding to the first uplink subcarrier spacing when the base station configures a correspondence between an operation mode and an uplink subcarrier spacing; or the indication information includes an operation mode corresponding to a combination of the first uplink subcarrier spacing and an uplink transmission mode when the base station configures a correspondence between an operation mode and a combination manner of an uplink subcarrier spacing and an uplink transmission mode.

According to the uplink subcarrier spacing indication method provided in this embodiment of the present invention, in a system information broadcast process, the base station implicitly indicates, by using an operation mode, the first uplink subcarrier spacing supported by the base station or to be used by the base station. During the communication, the terminal does not need to explicitly indicate, in Msg.3, a second uplink subcarrier spacing supported by the terminal to the base station. Therefore, a bit in Msg.3 is saved.

Optionally, the performing, by the terminal, processing based on the communication includes:

determining, by the terminal according to the indication information, the first uplink subcarrier spacing supported by the base station; and determining, by the terminal according to the indication information, whether the first uplink subcarrier spacing is included in at least one second uplink subcarrier spacing supported by the terminal; and if yes, sending an uplink signal to the base station, or otherwise, researching for a cell.

According to the uplink subcarrier spacing indication method provided in this embodiment of the present invention, the base station determines the indication information that is used to indicate the first uplink subcarrier spacing supported by the base station, and communicates with the terminal according to the indication information. During the communication, the base station indicates the first uplink subcarrier spacing supported by the base station to the terminal, so that the terminal uses an appropriate uplink subcarrier spacing to send an uplink signal in a subsequent uplink signal sending process, and the base station can correctly demodulate the uplink signal sent by the terminal.

Optionally, the performing, by the terminal, processing based on the communication includes:

sending, by the terminal, a scheduling transmission message to the base station when the base station determines, according to the indication information, that there is at least one first uplink subcarrier spacing, where the scheduling transmission message carries a second uplink subcarrier spacing, and the second uplink subcarrier spacing is an uplink subcarrier spacing supported by the terminal and is one of the at least one first uplink subcarrier spacing.

According to the uplink subcarrier spacing indication method provided in this embodiment of the present invention, the base station determines, according to the indication information, that the base station supports at least one first uplink subcarrier spacing. In the process of communicating with the base station, the terminal explicitly indicates, in Msg.3, the second uplink subcarrier spacing supported by the terminal. This is suitable for the base station to perform management and control.

Optionally, the performing, by the terminal, processing based on the communication includes:

sending, by the terminal, a terminal category message to the base station when the base station determines, according to the indication information, that there is at least one first uplink subcarrier spacing, where the terminal category message carries a second uplink subcarrier spacing, and the second uplink subcarrier spacing is an uplink subcarrier spacing supported by the terminal and is one of the at least one first uplink subcarrier spacing.

According to the uplink subcarrier spacing indication method provided in this embodiment of the present invention, the base station determines, according to the indication information, that the base station supports at least one first uplink subcarrier spacing. The terminal also supports at least one first uplink subcarrier spacing. When the terminal needs to adjust an uplink subcarrier spacing, the terminal may indicate, in the UE category message, the second uplink subcarrier spacing supported by the terminal to the base station after a random access process. In this process, the terminal does not need to explicitly indicate, in Msg.3, the second uplink subcarrier spacing supported by the terminal to the base station. Therefore, a bit in Msg.3 is saved.

Optionally, the performing, by the terminal, processing based on the communication includes:

receiving, by the terminal, a radio resource control RRC message when the base station determines, according to the indication information, that there is at least one first uplink subcarrier spacing, where the RRC message is sent by the base station and carries a second uplink subcarrier spacing, and the second uplink subcarrier spacing is an uplink subcarrier spacing supported by the terminal.

According to the uplink subcarrier spacing indication method provided in this embodiment of the present invention, the base station may indicate the first uplink subcarrier spacing supported by the base station to the terminal by using radio resource control (Radio Resource Control, RRC) signaling after a random access process of the terminal. In this process, the terminal does not need to explicitly indicate, in Msg.3, the second uplink subcarrier spacing supported by the terminal to the base station. Therefore, a bit in Msg.3 is saved.

Optionally, the communicating, by a terminal, with a base station includes:

receiving, by the terminal, a synchronization signal sent by the base station according to the indication information, where the indication information includes a synchronization signal corresponding to a first group when the base station classifies synchronization signals into at least two groups based on a default configuration and each group corresponds to one type of uplink subcarrier spacing, and the first group is a group corresponding to the first uplink subcarrier spacing; or the indication information includes a synchronization signal corresponding to a first group when the base station classifies synchronization signals into at least three groups based on a default configuration and each group corresponds to a combination of one type of uplink subcarrier spacing and an uplink transmission mode, the first group is a group corresponding to a combination of the first uplink subcarrier spacing and an uplink transmission mode, and the uplink transmission mode includes single-tone transmission or multi-tone transmission.

According to the uplink subcarrier spacing indication method provided in this embodiment of the present invention, the base station implicitly indicates the first uplink subcarrier spacing by using the synchronization signal. In this process, the terminal does not need to explicitly indicate, in Msg.3, a second uplink subcarrier spacing supported by the terminal to the base station. Therefore, a bit in Msg.3 is saved.

Optionally, the communicating, by a terminal, with a base station includes:

receiving, by the terminal, a synchronization signal sent by the base station according to the indication information, where the indication information includes a synchronization signal corresponding to a first group when the base station classifies different time intervals between two consecutive synchronization signals into at least two groups based on time interval lengths between two consecutive synchronization signals and each group corresponds to one time interval length, and the first group is a group corresponding to the first uplink subcarrier spacing; or the indication information includes a synchronization signal corresponding to a first group when the base station classifies different time intervals between two consecutive synchronization signals into at least three groups based on time interval lengths between two consecutive synchronization signals and each group corresponds to a combination of one type of uplink subcarrier spacing and an uplink transmission mode, the first group is a group corresponding to a combination of the first uplink subcarrier spacing and an uplink transmission mode, and the uplink transmission mode includes single-tone transmission or multi-tone transmission.

According to the uplink subcarrier spacing indication method provided in this embodiment of the present invention, the base station implicitly indicates the first uplink subcarrier spacing by using the synchronization signal. In this process, the terminal does not need to explicitly indicate, in Msg.3, the second uplink subcarrier spacing supported by the terminal to the base station. Therefore, a bit in Msg.3 is saved.

According to a third aspect, an embodiment of the present invention provides a base station, including:

a processor, configured to determine indication information that is used to indicate a first uplink subcarrier spacing, where the first uplink subcarrier spacing is an uplink subcarrier spacing supported by the base station; and a transceiver, configured to communicate with a terminal according to the indication information determined by the processor.

Optionally, the processor is specifically configured to classify physical random access preamble sequences into at least two groups, where each group corresponds to one type of uplink subcarrier spacing, the indication information includes group information of a physical random access preamble sequence corresponding to a first group in the at least two groups, and the first group is a group corresponding to the first uplink subcarrier spacing; or the processor is specifically configured to classify physical random access preamble sequences into at least three groups, where each group corresponds to a combination of one type of uplink subcarrier spacing and an uplink transmission mode, the indication information includes group information of a physical random access preamble sequence corresponding to a first group in the at least three groups, the first group is a group corresponding to a combination of the first uplink subcarrier spacing and an uplink transmission mode, and the uplink transmission mode includes single-tone transmission or multi-tone transmission.

Optionally, the processor is specifically configured to classify PRACH signals in different formats into at least two groups based on PRACH signal formats, where the PRACH signal formats are determined based on at least one of the following parameters: a cyclic prefix CP length of the PRACH signal, a subcarrier spacing of the PRACH signal, and a repetition period of the PRACH signal, each group corresponds to one type of uplink subcarrier spacing, the indication information includes a PRACH signal format corresponding to a first group in the at least two groups, and the first group is a group corresponding to the first uplink subcarrier spacing; or the processor is specifically configured to classify PRACH signals in different formats into at least three groups based on PRACH signal formats, where the PRACH signal formats are determined based on at least one of the following parameters: a cyclic prefix CP length of the PRACH signal, a subcarrier spacing of the PRACH signal, and a repetition period of the PRACH signal, each group corresponds to a combination of one type of uplink subcarrier spacing and an uplink transmission mode, the indication information includes a PRACH signal format corresponding to a first group in the at least three groups, the first group is a group corresponding to a combination of the first uplink subcarrier spacing and an uplink transmission mode, and the uplink transmission mode includes single-tone transmission or multi-tone transmission.

Optionally, the processor is specifically configured to classify PRACH channel resource pools into at least two resource pools, where each resource pool corresponds to one type of uplink subcarrier spacing, the indication information includes configuration information of a first resource pool in the at least two resource pools, and the first resource pool is a resource pool corresponding to the first uplink subcarrier spacing; or the processor is specifically configured to classify PRACH channel resource pools into at least three resource pools, where each resource pool corresponds to a combination of one type of uplink subcarrier spacing and an uplink transmission mode, the indication information includes configuration information of a first resource pool in the at least three resource pools, the first resource pool is a resource pool corresponding to a combination of the first uplink subcarrier spacing and an uplink transmission mode, and the uplink transmission mode includes single-tone transmission or multi-tone transmission.

Optionally, the processor is specifically configured to configure a correspondence between an operation mode and an uplink subcarrier spacing, where the indication information includes an operation mode corresponding to the first uplink subcarrier spacing; or the processor is specifically configured to configure a correspondence between an operation mode and a combination manner, where the combination manner is a combination of an uplink subcarrier spacing and an uplink transmission mode, the uplink transmission mode includes single-tone transmission or multi-tone transmission, and the indication information includes an operation mode corresponding to a combination of the first uplink subcarrier spacing and an uplink transmission mode.

Optionally, the transceiver is specifically configured to send the indication information to the terminal.

Optionally, the transceiver is specifically configured to: when the processor determines, according to the indication information, that the base station supports at least one first uplink subcarrier spacing, receive a scheduling transmission message that is sent by the terminal and carries a second uplink subcarrier spacing, where the second uplink subcarrier spacing is an uplink subcarrier spacing supported by the terminal and is one of the at least one first uplink subcarrier spacing.

Optionally, the transceiver is specifically configured to: when the processor determines, according to the indication information, that the base station supports at least one first uplink subcarrier spacing, receive a terminal category message that is sent by the terminal and carries a second uplink subcarrier spacing, where the second uplink subcarrier spacing is an uplink subcarrier spacing supported by the terminal and is one of the at least one first uplink subcarrier spacing.

Optionally, the transceiver is specifically configured to: when the processor determines, according to the indication information, that the base station supports at least one first uplink subcarrier spacing and the processor determines a second uplink subcarrier spacing, send, to the terminal, a radio resource control RRC message carrying the second uplink subcarrier spacing, where the second uplink subcarrier spacing is an uplink subcarrier spacing supported by the terminal and is one of the at least one first uplink subcarrier spacing.

Optionally, the processor is specifically configured to determine the indication information based on a default configuration, where the default configuration is classifying synchronization signals into at least two groups, the synchronization signals include a primary synchronization signal and/or a secondary synchronization signal, each group corresponds to one type of uplink subcarrier spacing, the indication information includes a synchronization signal corresponding to a first group in the at least two groups, and the first group is a group corresponding to the first uplink subcarrier spacing; or the processor is specifically configured to determine the indication information based on a default configuration, where the default configuration is classifying synchronization signals into at least three groups, the synchronization signals include a primary synchronization signal and/or a secondary synchronization signal, each group corresponds to a combination of one type of uplink subcarrier spacing and an uplink transmission mode, the indication information includes a synchronization signal corresponding to a first group in the at least three groups, the first group is a group corresponding to a combination of the first uplink subcarrier spacing and an uplink transmission mode, and the uplink transmission mode includes single-tone transmission or multi-tone transmission; and the transceiver is specifically configured to send the synchronization signal corresponding to the first group to the terminal according to the indication information.

Optionally, the processor is specifically configured to determine the indication information based on a default configuration, where the default configuration is classifying different time intervals between two consecutive synchronization signals into at least two groups based on time interval lengths between two consecutive synchronization signals, the synchronization signals include a primary synchronization signal and/or a secondary synchronization signal, each group corresponds to one time interval length, the indication information includes a synchronization signal with a time interval corresponding to a first group in the at least two groups, and the first group is a group corresponding to the first uplink subcarrier spacing; or the processor is specifically configured to determine the indication information based on a default configuration, where the default configuration is classifying different time intervals between two consecutive synchronization signals into at least three groups based on time interval lengths between two consecutive synchronization signals, the synchronization signals include a primary synchronization signal and/or a secondary synchronization signal, each group corresponds to a combination of one type of uplink subcarrier spacing and an uplink transmission mode, the indication information includes a synchronization signal with a time interval corresponding to a first group in the at least three groups, the first group is a group corresponding to a combination of the first uplink subcarrier spacing and an uplink transmission mode, and the uplink transmission mode includes single-tone transmission or multi-tone transmission; and the transceiver is specifically configured to send the synchronization signal corresponding to the first group to the terminal according to the indication information.

According to a fourth aspect, an embodiment of the present invention provides a terminal, including:

a transceiver, configured to communicate with a base station, where the communication is that the base station communicates with the terminal according to indication information, the indication information is used to indicate a first uplink subcarrier spacing, and the first uplink subcarrier spacing is an uplink subcarrier spacing supported by the base station; and a processor, configured to perform processing based on the communication performed by the transceiver.

Optionally, the transceiver is specifically configured to receive the indication information sent by the base station, where the indication information includes group information of a physical random access preamble sequence corresponding to a first group when the base station classifies physical random access preamble sequences into at least two groups, and the first group is a group corresponding to the first uplink subcarrier spacing when each of the at least two groups corresponds to one type of uplink subcarrier spacing; or the indication information includes group information of a physical random access preamble sequence corresponding to a first group when the base station classifies physical random access preamble sequences into at least three groups, the first group is a group corresponding to a combination of the first uplink subcarrier spacing and an uplink transmission mode when each of the at least three groups corresponds to a combination of one type of uplink subcarrier spacing and an uplink transmission mode, and the uplink transmission mode includes single-tone transmission or multi-tone transmission.

Optionally, the transceiver is specifically configured to receive the indication information sent by the base station, where the indication information includes a PRACH signal format corresponding to a first group when the base station classifies PRACH signals in different formats into at least two groups based on PRACH signal formats, the PRACH signal formats are determined based on at least one of the following parameters: a cyclic prefix CP length of the PRACH signal, a subcarrier spacing of the PRACH signal, and a repetition period of the PRACH signal, and the first group is a group corresponding to the first uplink subcarrier spacing when each of the at least two groups corresponds to one type of uplink subcarrier spacing; or the indication information includes a PRACH signal format corresponding to a first group when the base station classifies PRACH signals in different formats into at least three groups based on PRACH signal formats, the PRACH signal formats are determined based on at least one of the following parameters: a cyclic prefix CP length of the PRACH signal, a subcarrier spacing of the PRACH signal, and a repetition period of the PRACH signal, the first group is a group corresponding to a combination of the first uplink subcarrier spacing and an uplink transmission mode when each of the at least three groups corresponds to a combination of one type of uplink subcarrier spacing and an uplink transmission mode, and the uplink transmission mode includes single-tone transmission or multi-tone transmission.

Optionally, the transceiver is specifically configured to receive the indication information sent by the base station, where the indication information includes configuration information of a first resource pool when the base station classifies PRACH channel resource pools into at least two resource pools, and the first resource pool is a resource pool corresponding to the first uplink subcarrier spacing when each of the at least two resource pools corresponds to one type of uplink subcarrier spacing; or the indication information includes configuration information of a first resource pool when the base station classifies PRACH channel resource pools into at least three resource pools, the first resource pool is a resource pool corresponding to a combination of the first uplink subcarrier spacing and an uplink transmission mode when each of the at least three resource pools corresponds to a combination of one type of uplink subcarrier spacing and an uplink transmission mode, and the uplink transmission mode includes single-tone transmission or multi-tone transmission.

Optionally, the transceiver is specifically configured to receive the indication information sent by the base station, where the indication information includes an operation mode corresponding to the first uplink subcarrier spacing when the base station configures a correspondence between an operation mode and an uplink subcarrier spacing; or the indication information includes an operation mode corresponding to a combination of the first uplink subcarrier spacing and an uplink transmission mode when the base station configures a correspondence between an operation mode and a combination manner of an uplink subcarrier spacing and an uplink transmission mode.

Optionally, the processor is specifically configured to: determine, according to the indication information, the first uplink subcarrier spacing supported by the base station; determine, according to the indication information, whether the first uplink subcarrier spacing is included in at least one second uplink subcarrier spacing supported by the terminal; and if yes, send an uplink signal to the base station, or otherwise, research for a cell.

Optionally, the processor is specifically configured to send an instruction to the transceiver when the base station determines, according to the indication information, that there is at least one first uplink subcarrier spacing, so that the transceiver sends a scheduling transmission message to the base station, where the scheduling transmission message carries a second uplink subcarrier spacing, and the second uplink subcarrier spacing is an uplink subcarrier spacing supported by the terminal and is one of the at least one first uplink subcarrier spacing.

Optionally, the processor is specifically configured to send an instruction to the transceiver when the base station determines, according to the indication information, that there is at least one first uplink subcarrier spacing, so that the transceiver sends a terminal category message to the base station, where the terminal category message carries a second uplink subcarrier spacing, and the second uplink subcarrier spacing is an uplink subcarrier spacing supported by the terminal and is one of the at least one first uplink subcarrier spacing.

Optionally, the processor is specifically configured to send an instruction to the transceiver when the base station determines, according to the indication information, that there is at least one first uplink subcarrier spacing, so that the transceiver receives a radio resource control RRC message that is sent by the base station and that carries a second uplink subcarrier spacing, where the second uplink subcarrier spacing is an uplink subcarrier spacing supported by the terminal and is one of the at least one first uplink subcarrier spacing.

Optionally, the transceiver is specifically configured to receive a synchronization signal sent by the base station according to the indication information, where the indication information includes a synchronization signal corresponding to a first group when the base station classifies synchronization signals into at least two groups based on a default configuration and each group corresponds to one type of uplink subcarrier spacing, and the first group is a group corresponding to the first uplink subcarrier spacing; or the indication information includes a synchronization signal corresponding to a first group when the base station classifies synchronization signals into at least three groups based on a default configuration and each group corresponds to a combination of one type of uplink subcarrier spacing and an uplink transmission mode, the first group is a group corresponding to a combination of the first uplink subcarrier spacing and an uplink transmission mode, and the uplink transmission mode includes single-tone transmission or multi-tone transmission.

Optionally, the transceiver is specifically configured to receive a synchronization signal sent by the base station according to the indication information, where the indication information includes a synchronization signal corresponding to a first group when the base station classifies different time intervals between two consecutive synchronization signals into at least two groups based on time interval lengths between two consecutive synchronization signals and each group corresponds to one time interval length, and the first group is a group corresponding to the first uplink subcarrier spacing; or the indication information includes a synchronization signal corresponding to a first group when the base station classifies different time intervals between two consecutive synchronization signals into at least three groups based on time interval lengths between two consecutive synchronization signals and each group corresponds to a combination of one type of uplink subcarrier spacing and an uplink transmission mode, the first group is a group corresponding to a combination of the first uplink subcarrier spacing and an uplink transmission mode, and the uplink transmission mode includes single-tone transmission or multi-tone transmission.

According to the uplink subcarrier spacing indication method, the base station, and the terminal that are provided in the embodiments of the present invention, the base station determines the indication information that is used to indicate the first uplink subcarrier spacing supported by the base station, and communicates with the terminal according to the indication information. During the communication, the base station indicates the first uplink subcarrier spacing supported by the base station to the terminal, so that the terminal subsequently determines, based on the first uplink subcarrier spacing, the second uplink subcarrier spacing supported by the terminal; or the base station receives information that is sent by the terminal and that carries the second uplink subcarrier spacing, in other words, receives an indication from the terminal, so as to learn of the second uplink subcarrier spacing supported by the terminal or to be used by the terminal to send an uplink signal. In this uplink subcarrier spacing indication process, the base station indicates the first uplink subcarrier spacing supported by the base station to the terminal, or the terminal indicates the second uplink subcarrier spacing supported by the terminal to the base station, so that the terminal uses an appropriate uplink subcarrier spacing to send an uplink signal in a subsequent uplink signal sending process, and the base station can correctly demodulate the uplink signal sent by the terminal.

DESCRIPTION OF EMBODIMENTS

Figure 1:
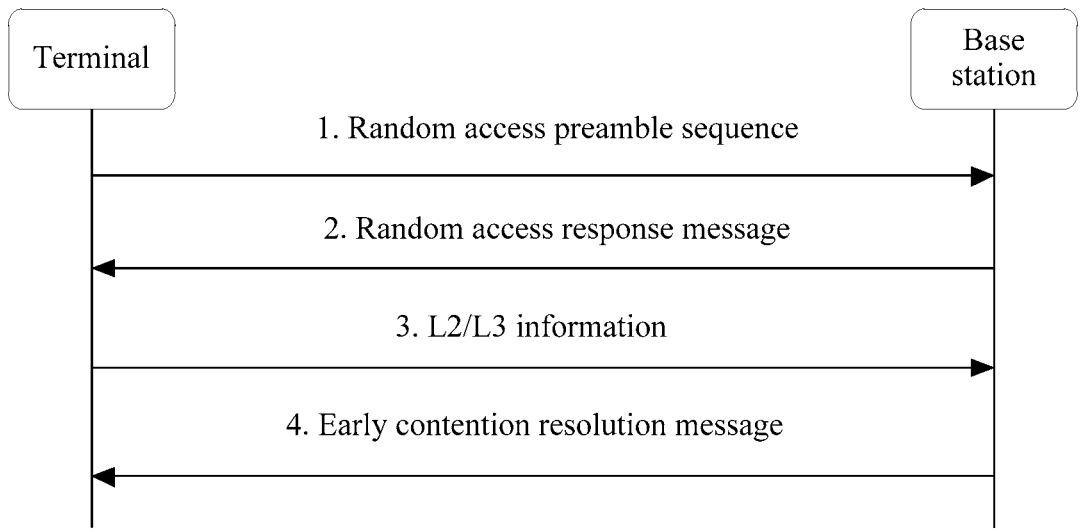
FIG. 1 shows a contention-based random access process in current LTE/LTE-A.

Currently, in an LTE/LTE-A system, a 15 kHz subcarrier spacing is used in both uplink data transmission and downlink data transmission, and no subcarrier spacing indication problem occurs. In addition, in the LTE/LTE-A system, five physical random access channel (Physical Random Access Channel, PRACH) formats are designed for different cell radiuses: a format 0 to a format 4 (Format 0 to Format 4). A 1.25 kHz subcarrier spacing is used for random access signals in the formats 0 to 3, and a 7.5 kHz subcarrier spacing is used for a random access signal in the format 4. It may be learned that a subcarrier spacing for the random access signal is different from a subcarrier spacing for a signal transmitted by a terminal on a channel such as a physical uplink shared channel (Physical Uplink Shared Channel, PUSCH) or a physical uplink control channel (Physical Uplink Control Channel, PUCCH), and the two subcarrier spacings are not associated. FIG. 1 shows a contention-based random access process in current LTE/LTE-A. Referring to FIG. 1, the random access process includes the following steps.

Step 1: UE sends a random access preamble sequence to a base station.

In this step, the UE may use a 1.25 kHz subcarrier spacing or may use a 7.5 kHz subcarrier spacing.

Step 2: The base station sends a random access response message to the UE.

Step 3: The terminal sends L2/L3 information to the base station.

In this step, the UE uses a 15 kHz subcarrier spacing.

Step 4: The base station sends an early contention resolution message to the terminal.

In the LTE/LTE-A system, a 15 kHz subcarrier spacing is used in both uplink data transmission and downlink data transmission. Therefore, when the UE uses the 15 kHz subcarrier spacing in step 3, the base station can parse an uplink signal. However, in an NB-IoT system, when the terminal uses single-tone transmission, because a 3.75 kHz subcarrier spacing or a 15 kHz subcarrier spacing may be used in single-tone transmission, if an uplink subcarrier spacing used by the UE is inconsistent with a subcarrier spacing supported by the base station, the base station cannot correctly demodulate an uplink signal of the terminal. In view of this, embodiments of the present invention provide an uplink subcarrier spacing indication method, a base station, and a terminal. The base station and the terminal indicate their respective supported uplink subcarrier spacings to each other, so that the base station can correctly demodulate an uplink signal sent by the terminal.

The technology described in this specification may be used to introduce NB-IoT into various communications systems, for example, current 2G and 3G communications systems and a next-generation communications system, such as the Global System for Mobile Communications (Global System for Mobile Communications, GSM), a Code Division Multiple Access (Code Division Multiple Access, CDMA) system, a Time Division Multiple Access (Time Division Multiple Access, TDMA) system, a Wideband Code Division Multiple Access (Wideband Code Division Multiple Access Wireless, WCDMA) system, a Frequency Division Multiple Access (Frequency Division Multiple Addressing, FDMA) system, an Orthogonal Frequency Division Multiple Access (Orthogonal Frequency-Division Multiple Access, OFDMA) system, a single carrier FDMA (SC-FDMA) system, a General Packet Radio Service (General Packet Radio Service, GPRS) system, a Long Term Evolution (Long Term Evolution, LTE) system, an E-UTRA system, and another communications system of this type.

The terminal related to this application may be a wireless terminal or may be a wired terminal. The wireless terminal may be a device that provides a user with voice and/or data connectivity, a handheld device with a wireless connection function, or another processing device connected to a wireless modem. The wireless terminal may communicate with one or more core networks by using a radio access network (for example, RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus. The mobile terminal exchanges voice and/or data with the radio access network. For example, the wireless terminal may be a device such as a personal communications service (Personal Communications Service, PCS) phone, a cordless telephone set, a Session Initiation Protocol (SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The base station related to this application may be a device that communicates a wireless terminal by using one or more sectors on an air interface in an access network. The base station may be configured to mutually convert a received over-the-air frame and an Internet Protocol (IP) packet, and is used as a router between the wireless terminal and a remaining part of the access network. The remaining part of the access network may include an IP network. The base station may further coordinate attribute management of the air interface. For example, the base station may be a base transceiver station (Base Transceiver Station, BTS) in GSM or CDMA, or may be a NodeB (NodeB) in WCDMA, or may be an evolved NodeB (NodeB, eNB, or e-NodeB, evolved NodeB) in LTE, and this is not limited in this application.

For the purpose of convenient and clear description, the technical solutions of the present invention are described in detail below by using an example in which NB-IoT is introduced into LTE/LTE-A and a base station is specifically an eNB. For details, refer to FIG. 2.

Figure 2:
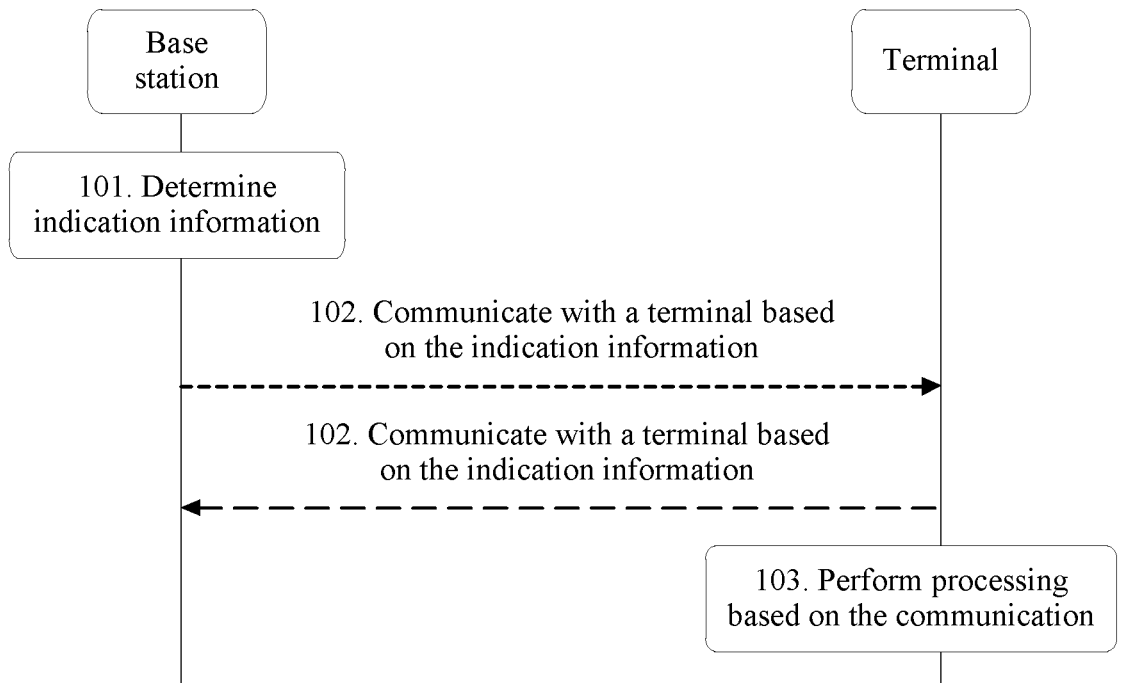
FIG. 2 is a signaling diagram of an uplink subcarrier spacing indication method according to Embodiment 1 of the present invention.

FIG. 2 is a signaling diagram of an uplink subcarrier spacing indication method according to Embodiment 1 of the present invention. This embodiment is applicable to a scenario in which a base station and a terminal need to indicate their respective supported uplink subcarrier spacings to each other. Specifically, this embodiment includes the following steps.

101. A base station determines indication information.

The indication information is used to indicate a first uplink subcarrier spacing. The first uplink subcarrier spacing is an uplink subcarrier spacing supported by the base station, and there may be one or more first uplink subcarrier spacings.

A subcarrier spacing is a basic parameter in a communications system and is measured in Hz. In an uplink data transmission process, only when a subcarrier spacing supported by the base station is consistent with an uplink subcarrier spacing used by a terminal, the base station can correctly demodulate an uplink signal sent by the terminal.

102. The base station communicates with a terminal according to the indication information.

In this step, the base station communicates with the terminal based on the determined indication information.

For example, when the indication information indicates that the base station supports only one type of uplink subcarrier spacing, in other words, there is only one type of first uplink subcarrier spacing, the base station communicates with the terminal (as shown in 102 from the base station to the terminal in FIG. 2), and explicitly or implicitly indicates the first uplink subcarrier spacing supported by the base station to the terminal. When the base station implicitly indicates the first uplink subcarrier spacing supported by the base station to the terminal, the indication information is indirect information of the first uplink subcarrier spacing, for example, group information of a physical random access preamble sequence corresponding to the first uplink subcarrier spacing; and after receiving the indication information, the terminal determines the corresponding first uplink subcarrier spacing according to the indication information. When the base station explicitly indicates the first uplink subcarrier spacing supported by the base station to the terminal, the indication information is direct information of the first uplink subcarrier spacing, to be specific, a specific uplink subcarrier spacing expressed in Hz.

For another example, when the indication information indicates that the base station supports at least one first uplink subcarrier spacing, for example, when the base station is configured by default to support at least one first uplink subcarrier spacing, the base station does not need to indicate an uplink subcarrier spacing supported by the base station to the terminal, but receives, in a process of communicating with the terminal, a scheduling transmission message or the like that is sent by the terminal and that carries a second uplink subcarrier spacing (as shown in 102 from the terminal to the base station in FIG. 2). The second uplink subcarrier spacing is an uplink subcarrier spacing supported by the terminal, and is one of the at least one first uplink subcarrier spacing supported by the base station.

103. The terminal performs processing based on the communication.

In this step, the terminal performs the corresponding processing based on the second uplink subcarrier spacing supported by the terminal and the first uplink subcarrier spacing supported by the base station.

For example, when the indication information indicates that the base station supports only one type of first uplink subcarrier spacing and the base station sends the indication information to the terminal, the terminal determines whether the second uplink subcarrier spacing is consistent with the first uplink subcarrier spacing. If the second uplink subcarrier spacing is consistent with the first uplink subcarrier spacing, the terminal may send an uplink signal or the like. If the second uplink subcarrier spacing is inconsistent with the first uplink subcarrier spacing, the terminal needs to research for a cell.

For another example, when the terminal supports two second uplink subcarrier spacings (3.75 kHz and 15 kHz) and one first uplink subcarrier spacing (15 kHz), the terminal determines the 15 kHz second uplink subcarrier spacing from the two second uplink subcarrier spacings and sends an uplink signal by using this second uplink subcarrier spacing.

For still another example, when the indication information indicates that there are two first uplink subcarrier spacings (3.75 kHz and 15 kHz) and the terminal determines that the terminal also supports two second uplink subcarrier spacings (3.75 kHz and 15 kHz), the terminal determines an appropriate second uplink subcarrier spacing from the two second uplink subcarrier spacings and sends an uplink signal to the base station. In the determining process, the terminal determines an optimal second uplink subcarrier spacing from the two second uplink subcarrier spacings based on a capability of the terminal, a path loss in the communication between the terminal and the base station, the first uplink subcarrier spacing configured by the base station for the terminal, and the like. The path loss in the communication between the terminal and the base station may be measured by using a synchronization signal or a reference signal. Generally, with a same transmit power, a smaller subcarrier spacing ensures a longer transmission distance. Therefore, a smaller subcarrier spacing may be selected when a path loss is high, and a larger subcarrier spacing may be selected when a path loss is low.

According to the uplink subcarrier spacing indication method provided in this embodiment of the present invention, the base station determines the indication information that is used to indicate the first uplink subcarrier spacing supported by the base station, and communicates with the terminal according to the indication information. During the communication, the base station indicates the first uplink subcarrier spacing supported by the base station to the terminal, so that the terminal subsequently determines, based on the first uplink subcarrier spacing, the second uplink subcarrier spacing supported by the terminal; or the base station receives information that is sent by the terminal and that carries the second uplink subcarrier spacing, in other words, receives an indication from the terminal, so as to learn of the second uplink subcarrier spacing supported by the terminal or to be used by the terminal to send an uplink signal. In this uplink subcarrier spacing indication process, the base station indicates the first uplink subcarrier spacing supported by the base station to the terminal, or the terminal indicates the second uplink subcarrier spacing supported by the terminal to the base station, so that the terminal uses an appropriate uplink subcarrier spacing to send an uplink signal in a subsequent uplink signal sending process, and the base station can correctly demodulate the uplink signal sent by the terminal.

Figure 3:
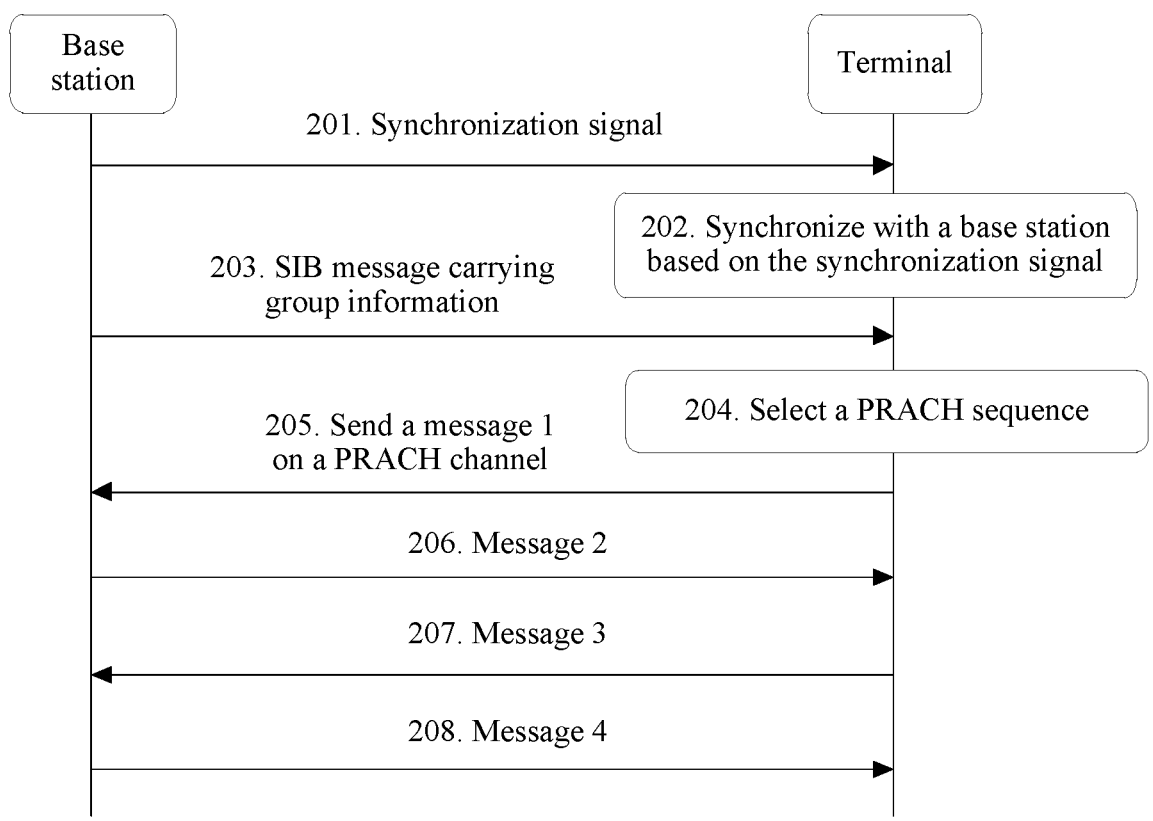
FIG. 3 is a signaling diagram of an uplink subcarrier spacing indication method according to Embodiment 2 of the present invention.

FIG. 3 is a signaling diagram of an uplink subcarrier spacing indication method according to Embodiment 2 of the present invention. In this embodiment, a base station implicitly indicates, by using different random access preamble sequence groups, a first uplink subcarrier spacing supported by the base station or to be used by the base station. In this process, the base station classifies physical random access preamble sequences into at least two groups, and each group corresponds to one type of uplink subcarrier spacing. In this case, indication information includes group information of a physical random access preamble sequence corresponding to a first group in the at least two groups, and the first group is a group corresponding to the first uplink subcarrier spacing. In a process of communicating with a terminal according to the indication information, the base station sends the indication information, to be specific, group information of a physical random access preamble sequence corresponding to the first uplink subcarrier spacing, to the terminal in a system information broadcast process. Specifically, this embodiment includes the following steps.

201. The base station sends a synchronization signal to the terminal.

The synchronization signal includes a primary synchronization signal (Primary Synchronization Signal, PSS) and/or a secondary synchronization signal (Secondary Synchronization Signal, SSS). The primary synchronization signal is, for example, a narrowband primary synchronization signal (NB-PSS), and the secondary synchronization signal is, for example, a narrowband secondary synchronization signal (NB-SSS).

202. The terminal synchronizes with the base station based on the synchronization signal.

203. The base station sends, to the terminal, a system information block (System Information Block, SIB) message that carries group information.

Generally, in a random access process, the terminal may select one PRACH signal sequence preamble sequence from a group of physical random access preamble sequences and send the selected PRACH signal sequence preamble sequence to the base station. In this step, when determining the indication information, the base station classifies these PRACH signal sequence preamble sequences into a plurality of groups in advance, and each group corresponds to one type of uplink subcarrier spacing. For example, it is assumed that there are N (N≥2 and N is a positive integer) PRACH signal sequences in total and the N PRACH signal sequences are classified into two groups: G1 and G2. G1 includes sequences whose sequence numbers are 0 to N/2−1, to be specific, G1={0, 1, . . . , N−1/2}. G2 includes sequences whose sequence numbers are N/2 to N−1, to be specific, G2={N/2, N/2+1, . . . , N−1}. G1 may be allocated to a terminal that supports a 3.75 kHz uplink subcarrier spacing, and G2 may be allocated to a terminal that supports a 15 kHz uplink subcarrier spacing. Then the group information corresponding to a first uplink subcarrier spacing is carried in the SIB message and sent to a terminal. In this case, after the terminal receives the group information, if the terminal supports one second uplink subcarrier spacing, the terminal determines whether the second uplink subcarrier spacing is consistent with the first uplink subcarrier spacing. If the second uplink subcarrier spacing is consistent with the first uplink subcarrier spacing, step 204 is performed to select one PRACH preamble sequence from the first group and send the selected PRACH preamble sequence to the base station. Correspondingly, the second uplink subcarrier spacing supported by the terminal may be determined based on a group to which the PRACH signal sequence belongs, provided that the base station detects the PRACH preamble sequence. Then, the base station properly allocates an uplink resource to and schedules an uplink resource for the terminal based on the second uplink subcarrier spacing supported by the terminal. Otherwise, the terminal researches for a cell if the terminal supports only one second uplink subcarrier spacing and the terminal determines, according to the indication information, that the second uplink subcarrier spacing is inconsistent with the first uplink subcarrier spacing. In addition, if the terminal supports a plurality of second uplink subcarrier spacings, the terminal selects, from the plurality of second uplink subcarrier spacings according to the indication information, an uplink subcarrier spacing consistent with the first uplink subcarrier spacing and selects a PRACH sequence.

It should be noted that although the present invention is described in detail by using an example in which the group information is carried in the SIB and broadcast to the terminal in this embodiment of the present invention, the present invention is not limited to this. In another feasible implementation, the group information of the PRACH signal sequences may be configured on the base station and the terminal in advance, and in this case, the group information does not need to be broadcast in the SIB.

204. The terminal selects a PRACH sequence.

205. The terminal sends a message 1 to the base station on a PRACH channel.

In this step, the terminal sends the message 1 (Message 1, Msg.1) to the base station on the PRACH channel. The message 1 carries the PRACH signal sequence selected in step 204. This step is equivalent to sending a random access preamble sequence on the PRACH channel.

206. The base station sends a message 2 to the terminal.

If the base station successfully detects Msg.1 sent by the terminal, the base station sends the message 2 (Message 2, Msg.2) to the terminal. Msg.2 is a random access response message and carries information about uplink scheduling performed on the terminal by the base station.

207. The terminal sends a message 3 to the base station by using a second uplink subcarrier spacing.

If the terminal successfully receives Msg.2 sent by the base station, the terminal considers that the base station permits the second uplink subcarrier spacing used by the terminal, and sends a first scheduling transmission message, to be specific, the message 3 (Message 3, Msg.3) to the base station by using the second uplink subcarrier spacing.

208. The base station sends a message 4 to the terminal.

If the base station successfully detects Msg.3, the base station sends a contention resolution message, to be specific, the message 4 (Message 4, Msg.4) to the terminal. If the terminal successfully demodulates the message 4, the terminal continues a subsequent procedure. Otherwise, the terminal returns to step 204.

In the foregoing embodiment, the base station implicitly indicates, by using different random access preamble sequence groups, the first uplink subcarrier spacing supported by the base station or to be used by the base station. However, the present invention is not limited to this. In another feasible implementation, the base station may indicate, in another manner, the first uplink subcarrier spacing supported by the base station.

For example, the base station classifies PRACH signals with different cyclic prefix (Cyclic Prefix, CP) lengths into at least two groups based on the CP lengths of the PRACH signals, each group corresponds to one type of uplink subcarrier spacing, the indication information includes a CP length of a PRACH signal corresponding to a first group in the at least two groups, and the first group is a group corresponding to the first uplink subcarrier spacing. Then, in a process of communicating with the terminal according to the indication information, the base station sends, to the terminal, the CP length of the PRACH signal corresponding to the first group. Specifically, different cyclic prefix lengths correspond to different formats and are further associated with different uplink subcarrier spacings. For example, two cyclic prefix lengths CP 1 and CP 2 respectively correspond to a PRACH signal format 1 and a PRACH signal format 2, CP 1<CP 2, CP 1 corresponds to a 15 kHz uplink subcarrier spacing, and CP 2 corresponds to a 3.75 kHz uplink subcarrier spacing.

For another example, the base station classifies PRACH signals with different subcarrier spacings into at least two groups based on the subcarrier spacings (Subcarrier Spacing, SP) of the PRACH signals, each group corresponds to one type of uplink subcarrier spacing, the indication information includes a subcarrier spacing of a PRACH signal corresponding to a first group in the at least two groups, and the first group is a group corresponding to the first uplink subcarrier spacing. Then, in a process of communicating with the terminal according to the indication information, the base station sends, to the terminal, the subcarrier spacing of the PRACH signal corresponding to the first group. Specifically, subcarrier spacings of random access signals transmitted on a PRACH channel are different, and different PRACH signal subcarrier spacings correspond to different formats and are further associated with different uplink subcarrier spacings. For example, two PRACH signal subcarrier spacings SP 1 and SP 2 respectively correspond to a PRACH signal format 1 and a PRACH signal format 2, SP 1 corresponds to a 15 kHz uplink subcarrier spacing, and SP 2 corresponds to a 3.75 kHz uplink subcarrier spacing.

For still another example, the base station classifies PRACH signals with different repetition periods into at least two groups based on the repetition periods of the PRACH signals, each group corresponds to one type of uplink subcarrier spacing, the indication information includes a repetition period of a PRACH signal corresponding to a first group in the at least two groups, and the first group is a group corresponding to the first uplink subcarrier spacing. Then, in a process of communicating with the terminal according to the indication information, the base station sends, to the terminal, the repetition period of the PRACH signal corresponding to the first group. Specifically, in one PRACH signal time resource, a random access preamble sequence may repeat for a plurality of times, different quantities of repetition times correspond to different repetition periods (Repetition Period, RP) and different PRACH signal formats and are further associated with different uplink subcarrier spacings. For example, two PRACH signal repetition periods RP 1 and RP 2 respectively correspond to a PRACH signal format 1 and a PRACH signal format 2, RP 1 corresponds to a 15 kHz uplink subcarrier spacing, and RP 2 corresponds to a 3.75 kHz uplink subcarrier spacing.

In the foregoing embodiments, the present invention is described by using an example in which whether the uplink subcarrier spacing is specifically 15 kHz or 3.75 kHz is indicated. The indication process only requires that random access preamble sequences be classified into two groups, or PRACH signal formats be classified into two groups based on CP lengths, subcarrier spacings, repetition periods, or the like. One group corresponds to the 15 kHz uplink subcarrier spacing, and the other group corresponds to the 3.75 kHz uplink subcarrier spacing. However, in another implementation, not only whether the uplink subcarrier spacing is specifically 15 kHz or 3.75 kHz is indicated, but also whether an uplink transmission mode is single-tone transmission or multi-tone transmission needs to be indicated. In this case, there are the following three combinations:

Combination 1: Single-tone transmission+3.75 kHz uplink subcarrier spacing;

Combination 2: Single-tone transmission+15 kHz uplink subcarrier spacing; and

Combination 3: Multi-tone transmission+15 kHz uplink subcarrier spacing.

In this case, the random access preamble sequences need to be classified into only three groups, or the PRACH signal formats need to be classified into only three groups based on CP lengths, subcarrier spacings, repetition periods, or the like. One group corresponds to the combination 1, another group corresponds to the combination 2, and the last group corresponds to the combination 3.

For example, the base station classifies physical random access preamble sequences into at least three groups, each group corresponds to a combination of one type of uplink subcarrier spacing and an uplink transmission mode, the indication information includes group information of a physical random access preamble sequence corresponding to a first group in the at least two groups, the first group is a group corresponding to a combination of the first uplink subcarrier spacing and an uplink transmission mode, and the uplink transmission mode includes single-tone transmission or multi-tone transmission.

For another example, the base station classifies PRACH signals with different cyclic prefix CP lengths into at least three groups based on the CP lengths of the PRACH signals, each group corresponds to a combination of one type of uplink subcarrier spacing and an uplink transmission mode, the indication information includes a CP length of a PRACH signal corresponding to a first group in the at least three groups, the first group is a group corresponding to a combination of the first uplink subcarrier spacing and an uplink transmission mode, and the uplink transmission mode includes single-tone transmission or multi-tone transmission.

For still another example, the base station classifies PRACH signals with different subcarrier spacings into at least three groups based on the subcarrier spacings of the PRACH signals, each group corresponds to a combination of one type of uplink subcarrier spacing and an uplink transmission mode, the indication information includes a subcarrier spacing of a PRACH signal corresponding to a first group in the at least three groups, the first group is a group corresponding to a combination of the first uplink subcarrier spacing and an uplink transmission mode, and the uplink transmission mode includes single-tone transmission or multi-tone transmission.

For yet another example, the base station classifies PRACH signals with different repetition periods into at least three groups based on the repetition periods of the PRACH signals, each group corresponds to a combination of one type of uplink subcarrier spacing and an uplink transmission mode, the indication information includes a repetition period of a PRACH signal corresponding to a first group in the at least three groups, the first group is a group corresponding to a combination of the first uplink subcarrier spacing and an uplink transmission mode, and the uplink transmission mode includes single-tone transmission or multi-tone transmission.

In addition, the first uplink subcarrier spacing may not only be independently indicated by using a CP length of the PRACH signal, a subcarrier spacing of the PRACH signal, or a repetition period of the PRACH signal, but may also be indicated by using at least two of a CP length of the PRACH signal, a subcarrier spacing of the PRACH signal, or a repetition period of the PRACH signal. Specifically, the base station classifies PRACH signals in different formats into at least three groups based on PRACH signal formats, and the PRACH signal formats are determined based on at least two of the following parameters: a cyclic prefix CP length of the PRACH signal, a subcarrier spacing of the PRACH signal, and a repetition period of the PRACH signal. Each group corresponds to one type of uplink subcarrier spacing, the indication information includes a PRACH signal format corresponding to a first group in the at least three groups, and the first group is a group corresponding to the first uplink subcarrier spacing; or each group corresponds to a combination of one type of uplink subcarrier spacing and an uplink transmission mode, the indication information includes a PRACH signal format corresponding to a first group in the at least three groups, the first group is a group corresponding to a combination of the first uplink subcarrier spacing and an uplink transmission mode, and the uplink transmission mode includes single-tone transmission or multi-tone transmission In this embodiment, after sending a random access signal message (Msg.1), the terminal may send a first uplink message (Msg.3) to the base station by using the second uplink subcarrier spacing supported by the terminal, Msg.3 does not need to explicitly indicate the second uplink subcarrier spacing supported by the terminal to the base station, a current Msg.3 format may still be used, and a change to the Msg.3 format is prevented. In addition, in this process, terminals served by a same cell may configure different subcarrier spacings based on requirements of the terminals.

Figure 4:
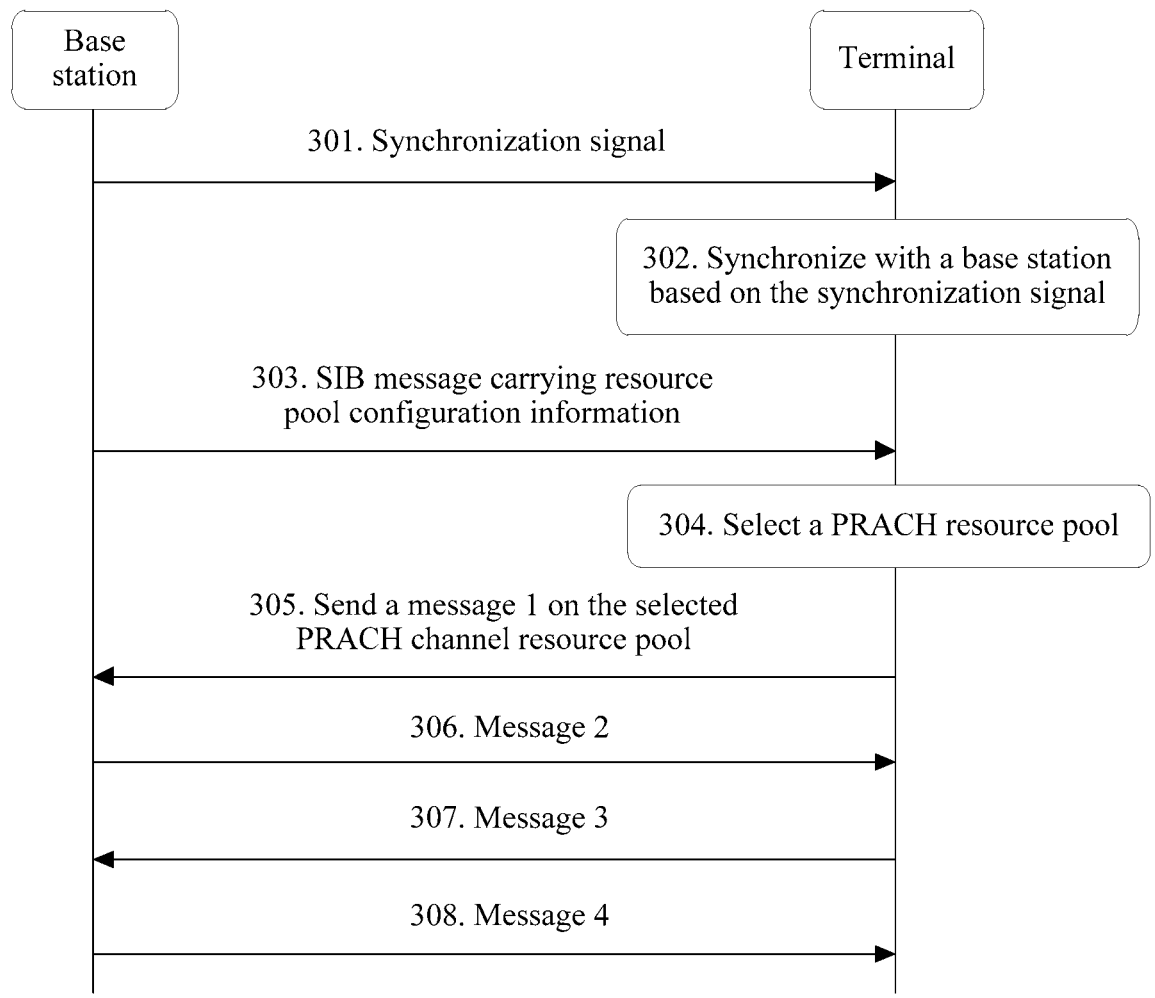
FIG. 4 is a signaling diagram of an uplink subcarrier spacing indication method according to Embodiment 3 of the present invention.

FIG. 4 is a signaling diagram of an uplink subcarrier spacing indication method according to Embodiment 3 of the present invention. In this embodiment, a base station implicitly indicates, by using random access preamble sequences transmitted on different PRACH channels, a first uplink subcarrier spacing supported by the base station or to be used by the base station. In this process, the base station classifies PRACH resource pools into at least two resource pools, and each resource pool corresponds to one type of uplink subcarrier spacing. In this case, the indication information includes configuration information of a first resource pool in the at least two resource pools, and the first resource pool is a resource pool corresponding to the first uplink subcarrier spacing. The base station sends the configuration information of the first resource pool to a terminal in a system information broadcast process. Specifically, this embodiment includes the following steps.

301. The base station sends a synchronization signal to the terminal.

Specifically, refer to step 201 in FIG. 3. Details are not described herein again.

302. The terminal synchronizes with the base station based on the synchronization signal.

303. The base station sends, to the terminal, a system information block (System Information Block, SIB) message that carries resource pool configuration information.

Specifically, the base station classifies available PRACH channel resources into a plurality of PRACH channel resource pools through frequency division multiplexing, time division multiplexing, or code division multiplexing. Different resource pools are associated with different uplink subcarrier spacings. The terminal determines a to-be-used uplink subcarrier spacing based on resource allocation information of the base station, a capability of the terminal, another condition, and the like. Then, the base station sends a random access signal in a corresponding PRACH channel resource pool, and the base station can properly schedule the terminal after detecting the random access signal.

Figure 5A:
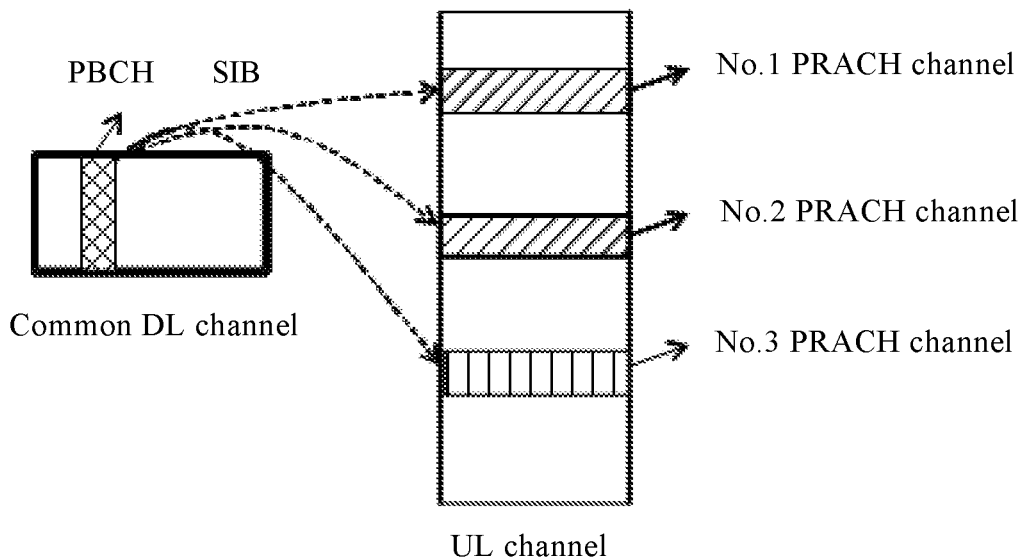
FIG. 5A is a schematic diagram of configuring a PRACH channel resource pool through frequency division multiplexing in the uplink subcarrier spacing indication method according to Embodiment 3 of the present invention.
Figure 5B:
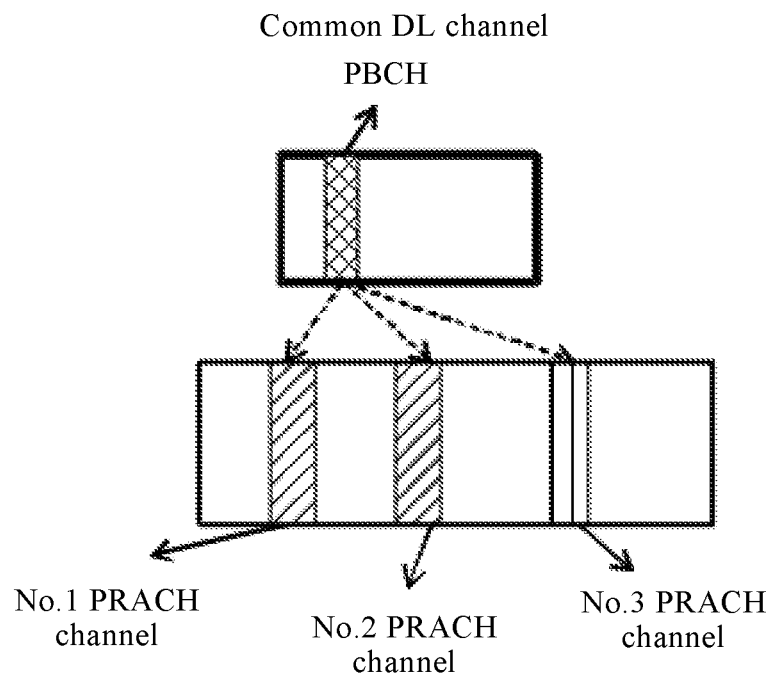
FIG. 5B is a schematic diagram of configuring a PRACH channel resource pool through time division multiplexing in the uplink subcarrier spacing indication method according to Embodiment 3 of the present invention.

For example, the base station configures three PRACH channel resource pools. One resource pool is to be used by a terminal that supports a 15 kHz uplink subcarrier spacing and uses single-tone transmission as an uplink transmission mode, and the other two PRACH resource pools are to be used by a terminal that supports a 3.75 kHz uplink subcarrier spacing and a single-tone transmission mode. In this case, a 3-bit information element (Information Element, IE) may be used to indicate the configuration information of the resource pool. Specifically, refer to Table 1, FIG. 5A, and FIG. 5B. Table 1 shows IE examples indicating a mapping relationship between a PRACH channel resource pool and an uplink subcarrier spacing. FIG. 5A is a schematic diagram of configuring a PRACH channel resource pool through frequency division multiplexing in the uplink subcarrier spacing indication method according to Embodiment 3 of the present invention. FIG. 5B is a schematic diagram of configuring a PRACH channel resource pool through time division multiplexing in the uplink subcarrier spacing indication method according to Embodiment 3 of the present invention.

a second uplink subcarrier spacing supported by the terminal, and selects the PRACH channel resource pool.

305. The terminal sends a message 1 to the base station on the selected PRACH channel resource pool.

In this step, the terminal sends the message 1 (Message 1, Msg.1) to the base station on a PRACH channel.

306. The base station sends a message 2 to the terminal.

TABLE 1

| b2 b1 b0 | Description | Illustration |
|---|---|---|
| 1 1 0 | The first PRACH channel resource pool and the second PRACH channel resource pool are to be used by a terminal that supports a 3.75 kHz uplink subcarrier spacing. The third PRACH channel resource pool is to be used by a terminal that supports a 15 kHz uplink subcarrier spacing. | Meaning of the bit values: 1 indicates that a corresponding PRACH channel resource pool supports a 3.75 kHz uplink subcarrier spacing. 0 indicates that a corresponding PRACH channel resource pool supports a 15 kHz uplink subcarrier spacing. |
| 0 0 1 | The first PRACH channel resource pool and the second PRACH channel resource pool are to be used by a terminal that supports a 15 kHz uplink subcarrier spacing. The third PRACH channel resource pool is to be used by a terminal that supports a 3.75 kHz uplink subcarrier spacing. | |

Referring to FIG. 5A, a physical broadcast channel (Physical Broadcast Channel, PBCH) of a common downlink channel (Common DL channel) carries a broadcast message to indicate a location and a use mode of a PRACH channel, and a plurality of PRACH channels are classified into a No.1 PRACH signal channel, a No.2 PRACH channel, and a No.3 PRACH channel through frequency division multiplexing. The No.1 PRACH channel and the No.2 PRACH channel are to be used by a terminal supporting a 3.75 kHz uplink subcarrier spacing and the No.3 PRACH channel is to be used by a terminal supporting a 15 kHz uplink subcarrier spacing. The only difference between FIG. 5B and FIG. 5A is that resource pools are classified through frequency division multiplexing in FIG. 5B.

Refer to Table 1, FIG. 5A, and FIG. 5B again. FIG. 5A is a schematic diagram of three frequency division multiplexing PRACH resource pools that occupy a same time domain location and correspond to the IE bit value (1 1 0) in Table 1. FIG. 5B is a schematic diagram of three time division multiplexing PRACH channel resource pools that occupy a same frequency domain location and correspond to the IE bit value (1 1 0) in Table 1. Different PRACH channel resource pools may use a same random access preamble sequence. The base station may configure or adjust a resource pool size and a resource pool quantity based on a report of the terminal.

It should be noted that although the present invention is described in detail by using an example in which configuration information of a PRACH channel resource pool is carried in the SIB and broadcast to the terminal in this embodiment of the present invention, the present invention is not limited to this. In another feasible implementation, the configuration information of the PRACH channel resource pool may be configured on the base station and the terminal in advance, and in this case, the configuration information of the PRACH channel resource pool does not need to be broadcast in the SIB.

304. The terminal selects a PRACH channel resource pool.

In this step, the terminal determines, based on the SIB message, a capability of the terminal, and another condition, If the base station successfully detects Msg.1 sent by the terminal, the base station sends the message 2 (Message 2, Msg.2) to the terminal. Msg.2 is a random access response message and carries information about uplink scheduling performed on the terminal by the base station.

307. The terminal sends a message 3 to the base station by using a second uplink subcarrier spacing.

If the terminal successfully receives Msg.2 sent by the base station, the terminal considers that the base station permits the second uplink subcarrier spacing used by the terminal and determined in step 304, and sends a first scheduling transmission message, to be specific, the message 3 (Message 3, Msg.3) to the base station by using the second uplink subcarrier spacing.

308. The base station sends a message 4 to the terminal.

If the base station successfully detects Msg.3, the base station sends a contention resolution message, to be specific, the message 4 (Message 4, Msg.4) to the terminal. If the terminal successfully demodulates the message 4, the terminal continues a subsequent procedure. Otherwise, the terminal returns to step 304.

It should be noted that, in the foregoing embodiment, the present invention is described in detail by using an example in which the PRACH resource pools are classified into at least two resource pools and each resource pool corresponds to one type of uplink subcarrier spacing. However, the present invention is not limited to this. In another feasible implementation, each resource pool may correspond to a combination of one type of uplink subcarrier spacing and an uplink transmission mode, the indication information includes configuration information of a first resource pool in the at least two resource pools, the first resource pool is a resource pool corresponding to a combination of the first uplink subcarrier spacing and an uplink transmission mode, and the uplink transmission mode includes single-tone transmission or multi-tone transmission. In a subsequent process of communicating with the terminal according to the indication information, the base station sends, to the terminal, configuration information of the resource pool corresponding to the combination of the first uplink subcarrier spacing and the uplink transmission mode. For example, in FIG. 5A and FIG. 5B, a No.1 PRACH channel is to be used by a terminal that supports a 3.75 kHz uplink subcarrier spacing and single-tone transmission, a No.2 PRACH channel is to be used by a terminal that supports a 15 kHz uplink subcarrier spacing and single-tone transmission, and a No.3 PRACH channel is to be used by a terminal that supports a 15 kHz uplink subcarrier spacing and multi-tone transmission. In this case, meanings of the three-bit IE values in Table 1 are changed.

In this embodiment, after sending a random access signal message (Msg.1), the terminal may send a first uplink message (Msg.3) to the base station by using a second uplink subcarrier spacing supported by the terminal, Msg.3 does not need to explicitly indicate the second uplink subcarrier spacing supported by the terminal to the base station, a current Msg.3 format may still be used, and a change to the Msg.3 format is prevented. In addition, in this process, terminals served by a same cell may configure different subcarrier spacings based on requirements of the terminals. In addition, in this embodiment, one PRACH channel resource pool is multiplexed as a plurality of PRACH channel resource pools. Therefore, more terminals can access the PRACH channel resource pool, and a probability of random access conflicts is reduced, so that the indication information sent by the base station is more reliable.

Figure 6:
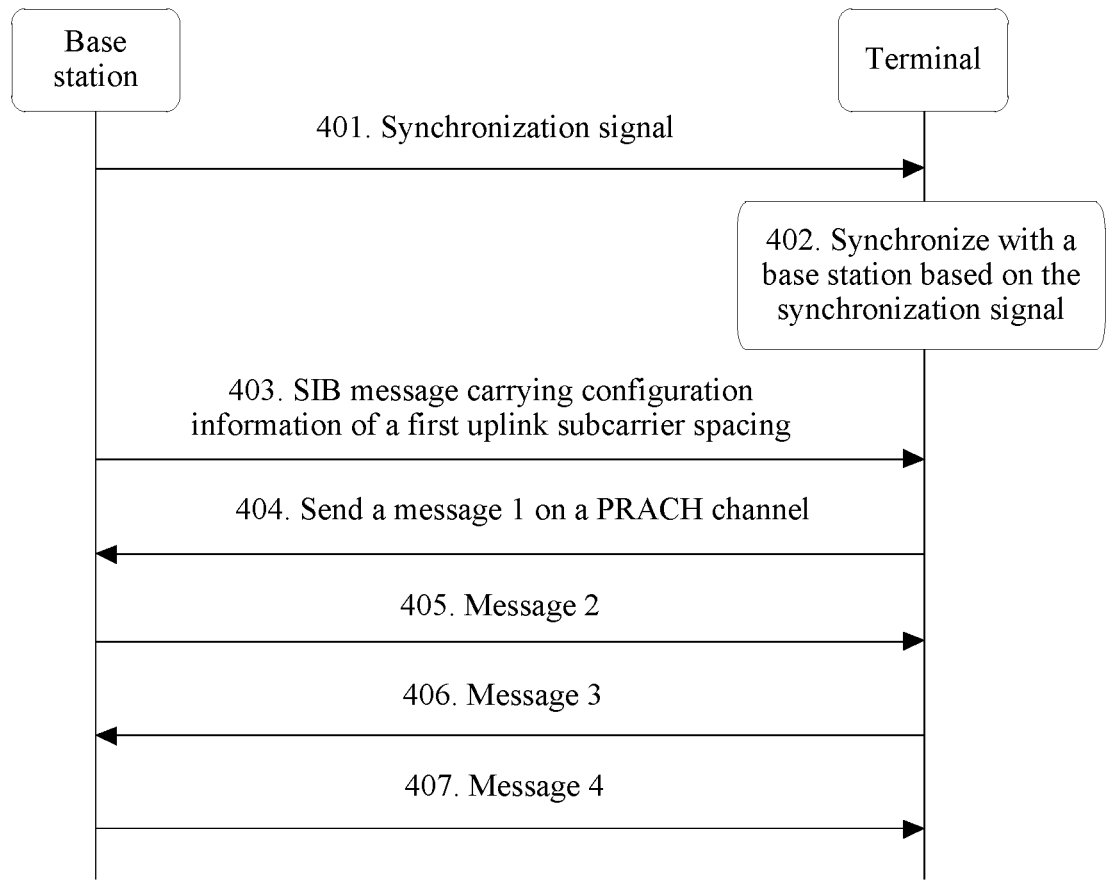
FIG. 6 is a signaling diagram of an uplink subcarrier spacing indication method according to Embodiment 4 of the present invention.

FIG. 6 is a signaling diagram of an uplink subcarrier spacing indication method according to Embodiment 4 of the present invention. In this embodiment, a base station determines, based on the indication information, that the base station supports at least one first uplink subcarrier spacing. In a process of communicating with the base station, a terminal explicitly indicates, in Msg.3, a second uplink subcarrier spacing supported by the terminal. Specifically, this embodiment includes the following steps.

401. The base station sends a synchronization signal to the terminal.

Specifically, refer to step 201 in FIG. 3. Details are not described herein again.

402. The terminal synchronizes with the base station based on the synchronization signal.

403. The base station sends, to the terminal, a system information block (System Information Block, SIB) message that carries configuration information of a first uplink subcarrier spacing.

When the base station supports at least one type of first uplink subcarrier spacing, 2 bits may be used to indicate the configuration information of the first uplink subcarrier spacing. Specifically, refer to Table 2. Table 2 shows an IE example of the 2-bit configuration information that is of the first uplink subcarrier spacing and that is carried in the SIB. If there are two types of first uplink subcarrier spacings, in other words, the base station supports both the two types of subcarrier spacings by default, the configuration information of the first uplink subcarrier spacing does not need to be carried in the SIB message.

TABLE 2

| b1 b0 | Description |
| --- | --- |
| 00 | Reserved |
| 01 | Supports a 15 kHz uplink subcarrier spacing |
| 10 | Supports a 3.75 kHz uplink subcarrier spacing |
| 11 | Supports both a 3.75 kHz uplink subcarrier spacing and a 15 kHz uplink subcarrier spacing |

In addition, if the base station configures either 3.75 kH or 15 kHz based on a management policy, 1 bit may be used to indicate the configuration information of the first uplink subcarrier spacing. Specifically, refer to Table 3. Table 3 shows an IE example of the 1-bit configuration information that is of the first uplink subcarrier spacing and that is carried in the SIB.

TABLE 3

| b0 | Description |
| --- | --- |
| 0 | An uplink subcarrier spacing is configured as 15 kHz. |
| 1 | An uplink subcarrier spacing configured as 3.75 kHz. |

It should be noted that when a single-tone transmission mode and a multi-tone transmission mode are not considered, if the base station supports two types of first uplink subcarrier spacings by default, to be specific, the base station supports both the 3.75 kHz uplink subcarrier spacing and the 15 kHz uplink subcarrier spacing, the configuration information of the first uplink subcarrier spacing may be not broadcast in the SIB message. In this case, the terminal uses, in a message 3, 1 bit to indicate a second uplink subcarrier spacing, so as to indicate, to the base station, whether the terminal supports the 3.75 kHz uplink subcarrier spacing or the 15 kHz uplink subcarrier spacing in subsequent uplink transmission. In this process, because Msg.3 is transmitted on a PUSCH, a default subcarrier spacing such as 3.75 kHz or 15 kHz needs to be specified.

404. The terminal sends a message 1 to the base station on a PRACH channel.

405. The base station sends a message 2 to the terminal.

If the base station successfully detects Msg.1 sent by the terminal, the base station sends the message 2 (Message 2, Msg.2) to the terminal. Msg.2 is a random access response message and carries information about uplink scheduling performed on the terminal by the base station.

406. The terminal determines a second uplink subcarrier spacing.

In this step, the terminal determines, based on the SIB message, a capability of the terminal, and another condition, the second uplink subcarrier spacing supported by the terminal.

407. The terminal sends, to the base station, a message 3 that carries configuration information of the second uplink subcarrier spacing.

Same as step 403, the configuration information of the second uplink subcarrier spacing may also be indicated by using a bit. Specifically, refer to Table 4. Table 4 shows an IE example of 1-bit configuration information that is of the second uplink subcarrier spacing and that is carried in Msg.3.

TABLE 4

| b0 | Description |
| --- | --- |
| 0 | A 15 kHz uplink subcarrier spacing is selected. |
| 1 | A 3.75 kHz uplink subcarrier spacing is selected. |

If the terminal successfully receives Msg.2 sent by the base station, the terminal considers that the base station permits the second uplink subcarrier spacing used by the terminal, and sends a first scheduling transmission message, to be specific, the message 3 (Message 3, Msg.3) to the base station by using the second uplink subcarrier spacing.

408. The base station sends a message 4 to the terminal.

If the base station successfully detects Msg.3, the base station sends a contention resolution message, to be specific, the message 4 (Message 4, Msg.4) to the terminal. If the terminal successfully demodulates the message 4, the terminal continues a subsequent procedure. Otherwise, the terminal returns to step 404.

Figure 7:
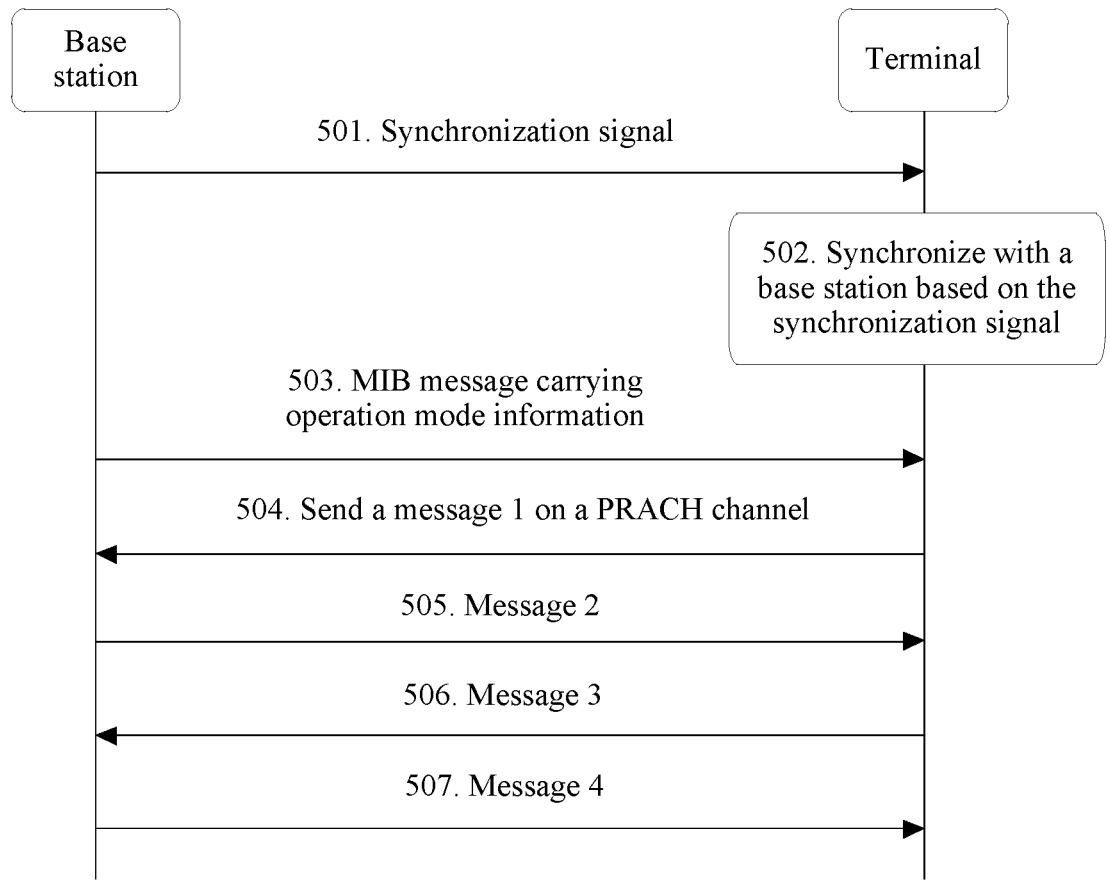
FIG. 7 is a signaling diagram of an uplink subcarrier spacing indication method according to Embodiment 5 of the present invention.

FIG. 7 is a signaling diagram of an uplink subcarrier spacing indication method according to Embodiment 5 of the present invention. In this embodiment, in a system information broadcast process, a base station implicitly indicates, by using an operation mode, a first uplink subcarrier spacing supported by the base station or to be used by the base station. In this process, the base station configures a correspondence between an operation mode and an uplink subcarrier spacing. In this case, indication information includes an operation mode corresponding to the first uplink subcarrier spacing. In a subsequent process of communicating with a terminal according to the indication information, the base station sends the operation mode supported by the base station to the terminal. Specifically, this embodiment includes the following steps.

501. The base station sends a synchronization signal to the terminal.

Specifically, refer to step 201 in FIG. 3. Details are not described herein again.

502. The terminal synchronizes with the base station based on the synchronization signal.

503. The base station sends, to the terminal, a master information block (Master Information Block, SIB) message that carries operation mode information.

An NB-IoT work group defines three operation modes:
(1) In-band mode (In-band mode): indicates that an NB-IoT system uses a resource on an LTE carrier;
(2) Guard band mode (Guard band mode): indicates that an NB-IoT system uses a resource on an LTE guard band; and
(3) Standalone mode (Standalone mode): indicates that an NB-IoT system uses a non-LTE carrier resource.

Because a 15 kHz uplink subcarrier spacing is used in LTE, to reduce interference on LTE uplink transmission, the base station may configure the terminal, to be specific, an NB-IoT terminal, to use the 15 kHz uplink subcarrier spacing in the in-band mode and use the 3.75 kHz uplink subcarrier spacing in the guard band mode and the standalone mode. Specifically, refer to Table 5. Table 5 shows a configuration manner of an operation mode and an uplink subcarrier spacing.

TABLE 5

| Operation mode | Uplink subcarrier spacing configuration |
|---|---|
| In-band mode | 15 kHz |
| Guard band mode | 3.75 kHz |
| Standalone mode | 3.75 kHz |

Not only whether the uplink subcarrier spacing is specifically 15 kHz or 3.75 kHz is indicated, but whether an uplink transmission mode is single-tone transmission or multi-tone transmission also needs to be indicated. In this case, the first uplink subcarrier spacing supported by the base station may also be implicitly indicated by using the operation mode. In this process, the base station configures a correspondence between an operation mode and a combination manner, the combination manner is a combination of an uplink subcarrier spacing and an uplink transmission mode, the uplink transmission mode includes single-tone transmission or multi-tone transmission, and the indication information includes an operation mode corresponding to a combination of the first uplink subcarrier spacing and an uplink transmission mode. Specifically, refer to Table 6. Table 6 shows another configuration manner of an operation mode and an uplink subcarrier spacing.

TABLE 6

| Operation mode | Uplink subcarrier spacing configuration |
|---|---|
| In-band mode | 15 kHz multi-tone transmission |
| Guard band mode | 15 kHz single-tone transmission |
| Standalone mode | 3.75 kHz single-tone transmission |

In this step, a 2-bit IE may be used to indicate an operation mode transmitted in a MIB message. After receiving the MIB message, the terminal may learn of the first uplink subcarrier spacing configured by the base station, and does not need to indicate a second uplink subcarrier spacing supported by the terminal to the base station.

Optionally, in this step, if the base station supports a plurality of operation modes, the base station may broadcast configuration information and the operation modes together in a MIB message, in other words, use different operation modes on different bands. After receiving the configuration message, the terminal uses a corresponding first uplink subcarrier spacing on a corresponding band.

504. The terminal sends a message 1 to the base station on a PRACH channel.

505. The base station sends a message 2 to the terminal.

If the base station successfully detects Msg.1 sent by the terminal, the base station sends the message 2 (Message 2, Msg.2) to the terminal. Msg.2 is a random access response message and carries information about uplink scheduling performed on the terminal by the base station.

506. The terminal sends a message 3 to the base station by using the first uplink subcarrier spacing.

If the terminal successfully receives Msg.2 sent by the base station, it is considered that the terminal sends a first scheduling transmission message, to be specific, the message 3 (Message 3, Msg.3) to the base station by using the first uplink subcarrier spacing.

507. The base station sends a message 4 to the terminal.

If the base station successfully detects Msg.3, the base station sends a contention resolution message, to be specific, the message 4 (Message 4, Msg.4) to the terminal. If the terminal successfully demodulates the message 4, the terminal continues a subsequent procedure. Otherwise, the terminal returns to step 504.

In this embodiment, the terminal does not need to explicitly indicate, in Msg.3, the second uplink subcarrier spacing supported by the terminal to the base station. Therefore, a bit in Msg.3 is saved.

In Embodiment 2, Embodiment 3, Embodiment 4, and Embodiment 5, in the system information broadcast process, the base station indicates the first uplink subcarrier spacing supported by the base station to the terminal. However, the present invention is not limited to this. In another feasible implementation, the base station may receive an indication from the terminal after a random access process of the terminal. In this case, after the random access process, the terminal indicates the second uplink subcarrier spacing supported by the terminal to the base station. For details, refer to Embodiment 6. Alternatively, the base station may indicate, after a random access process of the terminal, the first uplink subcarrier spacing supported by the base station to the terminal. For details, refer to Embodiment 7. Alternatively, the base station may indicate, before a random access process of the terminal, the first uplink subcarrier spacing supported by the base station to the terminal. For details, refer to Embodiment 8.

In the uplink subcarrier spacing indication method in Embodiment 6 according to an embodiment of the present invention, the base station determines, according to the indication information, that the base station supports at least one first uplink subcarrier spacing, and the second uplink subcarrier spacing supported by the terminal is one of the at least one first uplink subcarrier spacing. When the terminal needs to adjust an uplink subcarrier spacing, the terminal may indicate, in a terminal category (UE category) message, the second uplink subcarrier spacing supported by the terminal to the base station after the random access process. To be specific, the terminal indicates, in the UE category message, whether the terminal subsequently supports a 3.75 kHz uplink subcarrier spacing or a 15 kHz uplink subcarrier spacing. Correspondingly, the base station receives the terminal category (UE category) message that carries the second uplink subcarrier spacing and sent by the terminal after the random access process. In this embodiment, the terminal does not need to explicitly indicate, in Msg.3, the second uplink subcarrier spacing supported by the terminal to the base station. Therefore, a bit in Msg.3 is saved.

In the uplink subcarrier spacing indication method in Embodiment 7 according to an embodiment of the present invention, the base station may indicate the first uplink subcarrier spacing supported by the base station to the terminal by using radio resource control (Radio Resource Control, RRC) signaling after the random access process of the terminal. Specifically, the base station determines, according to the indication information, that the base station supports at least one first uplink subcarrier spacing, and the second uplink subcarrier spacing supported by the terminal is one of the at least one first uplink subcarrier spacing. When both the base station and the terminal support two types of uplink subcarrier spacings, the base station determines the second uplink subcarrier spacing that is one of a plurality of second uplink subcarrier spacings supported by the terminal, and the base station sends, to the terminal, a radio resource control (Radio Resource Control, RRC) message carrying the second uplink subcarrier spacing. In this process, the RRC signaling is transmitted on a narrowband physical downlink shared channel (Narrowband-Physical Downlink Shared Channel, NB-PDSCH), and 1 bit may be used to indicate the second uplink subcarrier spacing to be used by the terminal. In this embodiment, the terminal does not need to explicitly indicate, in Msg.3, the second uplink subcarrier spacing supported by the terminal to the base station. Therefore, a bit in Msg.3 is saved.

Figure 8:
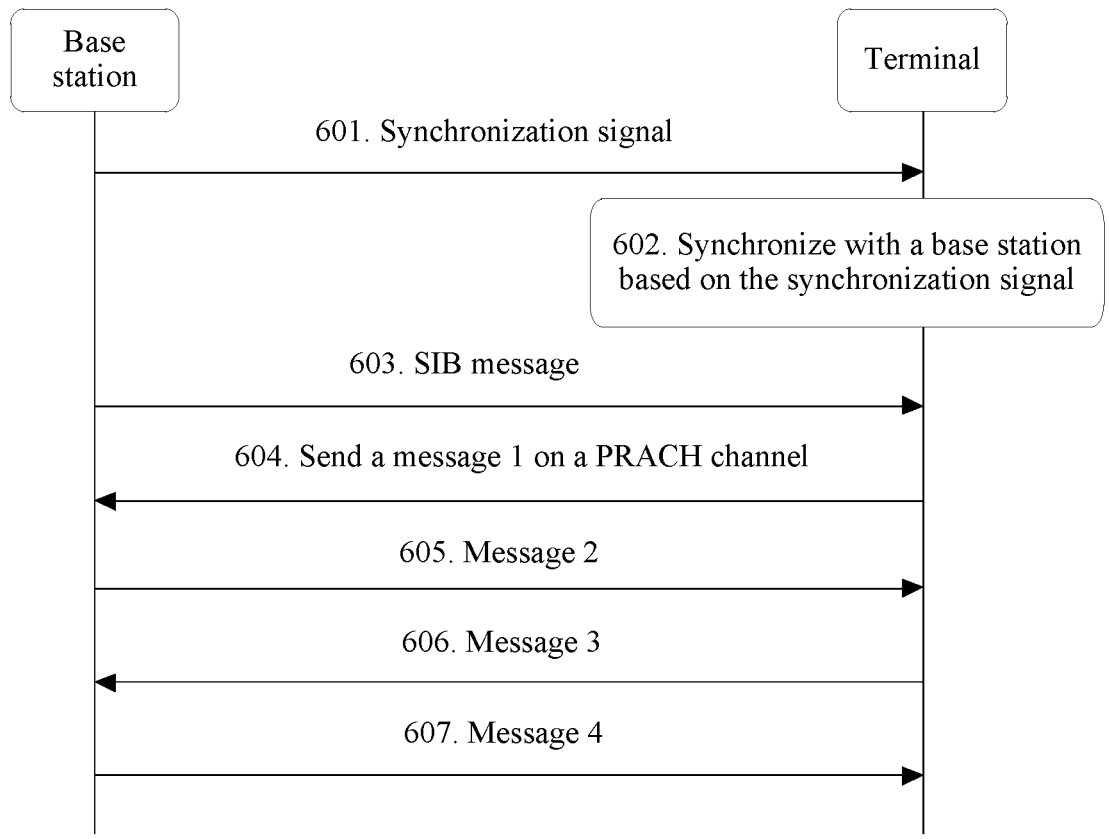
FIG. 8 is a signaling diagram of an uplink subcarrier spacing indication method according to Embodiment 8 of the present invention.

FIG. 8 is a signaling diagram of an uplink subcarrier spacing indication method according to Embodiment 8 of the present invention. In this embodiment, a base station implicitly indicates a first uplink subcarrier spacing by using a synchronization signal. In this process, in a possible implementation, the base station classifies synchronization signals into at least two groups, and each group corresponds to one type of uplink subcarrier spacing. In this case, the indication information includes a synchronization signal corresponding to a first group in the at least two groups, the first group is a group corresponding to the first uplink subcarrier spacing, and the synchronization signals include a primary synchronization signal and/or a secondary synchronization signal. Then, in a process of communicating with a terminal according to the indication information, the base station sends the synchronization signal corresponding to the first group to the terminal according to the indication information. In another possible implementation, the base station classifies different time intervals between two consecutive synchronization signals into two groups based on time interval lengths between two consecutive synchronization signals, and each group corresponds to one type of uplink subcarrier spacing. In this case, indication information includes a synchronization signal with a time interval corresponding to a first group in the at least two groups, the first group is a group corresponding to the first uplink subcarrier spacing, and the synchronization signals include a primary synchronization signal and/or a secondary synchronization signal. Then, in a process of communicating with a terminal according to the indication information, the base station sends the synchronization signal corresponding to the first group to the terminal according to the indication information. Specifically, this embodiment includes the following steps.

601. The base station sends a synchronization signal to the terminal.

The synchronization signal includes a primary synchronization signal (Primary Synchronization Signal, PSS) and/or a secondary synchronization signal (Secondary Synchronization Signal, SSS). The primary synchronization signal is, for example, a narrowband primary synchronization signal (NB-PSS), and the secondary synchronization signal is, for example, a narrowband secondary synchronization signal (NB-SSS).

In a possible implementation, the base station may indicate the first uplink subcarrier spacing by using a group of NB-PSS sequences and/or NB-SSS sequences.

Specifically, the base station classifies NB-PSSs or NB-SSSs into two groups, for example, a group 0 and a group 1. The group 0 indicates that the base station supports a 3.75 kHz first uplink subcarrier spacing, and the group 1 indicates that the base station supports a 15 kHz first uplink subcarrier spacing. In this case, when the base station sends a synchronization signal in the group 0, it is equivalent to indicating, to the terminal, that the base station supports the 3.75 kHz first uplink subcarrier spacing; and when the base station sends a synchronization signal in the group 1, it is equivalent to indicating, to the terminal, that the base station supports the 15 kHz first uplink subcarrier spacing.

In another possible implementation, the base station may indicate the first uplink subcarrier spacing by using a spacing between an NB-PSS sequence and an NB-SSS sequence. Specifically, referring to FIG. 9A and FIG. 9B, FIG. 9A is a schematic diagram of a spacing between an NB-PSS and an NB-SSS in the uplink subcarrier spacing indication method according to Embodiment 8 of the present invention, and FIG. 9B is another schematic diagram of a spacing between an NB-PSS and an NB-SSS in the uplink subcarrier spacing indication method according to Embodiment 8 of the present invention.

Figure 9A:
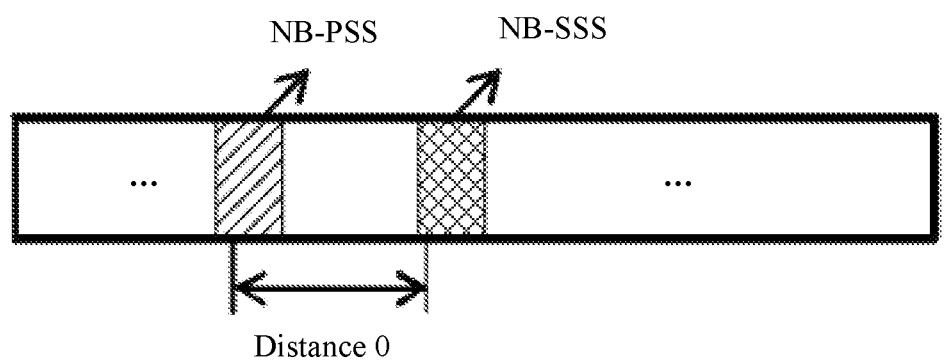
FIG. 9A is a schematic diagram of a spacing between an NB-PSS and an NB-SSS in the uplink subcarrier spacing indication method according to Embodiment 8 of the present invention.

Referring to FIG. 9A, a distance 0 (Distance 0) indicates that the base station supports a 3.75 kHz first uplink subcarrier spacing. When the terminal detects the distance 0, the terminal determines, according to the indication information, that the base station supports the 3.75 kHz first uplink subcarrier spacing, and the terminal subsequently uses a 3.75 kHz subcarrier spacing to send Msg.3. Otherwise, the terminal uses a 15 kHz uplink subcarrier spacing.

Figure 9B:
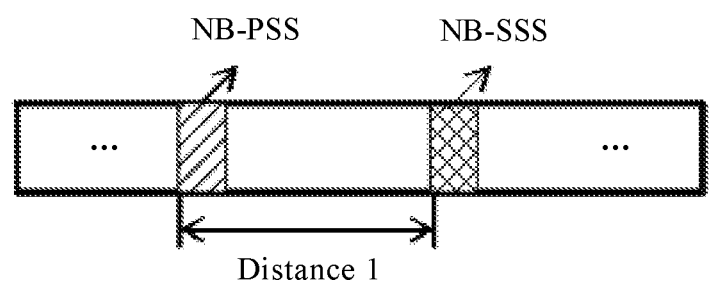
FIG. 9B is another schematic diagram of a spacing between an NB-PSS and an NB-SSS in the uplink subcarrier spacing indication method according to Embodiment 8 of the present invention.

Referring to FIG. 9B, a distance 1 (Distance 1) indicates that the base station supports a 3.75 kHz first uplink subcarrier spacing. When the terminal detects the distance 1, the terminal determines, according to the indication information, that the base station supports the 3.75 kHz first uplink subcarrier spacing, and the terminal subsequently uses a 3.75 kHz subcarrier spacing to send Msg.3. Otherwise, the terminal uses a 15 kHz uplink subcarrier spacing.

It should be noted that the two consecutive synchronization signals are the NB-PSS and the NB-SSS in the embodiments 9A and 9B. However, the present invention is not limited to this. In another feasible implementation, the two consecutive synchronization signals may be NB-PSSs or may be NB-SSSs.

602. The terminal synchronizes with the base station based on the synchronization signal.

603. The base station sends a system information block (System Information Block, SIB) message to the terminal.

In this step, the terminal sends and broadcasts system information to the terminal by using the SIB message.

604. The terminal sends a message 1 to the base station on a PRACH channel.

Specifically, refer to step 205 in FIG. 3. Details are not described herein again.

605. The base station sends a message 2 to the terminal.

Specifically, refer to step 206 in FIG. 3. Details are not described herein again.

606. The terminal sends a message 3 to the base station by using an uplink subcarrier spacing corresponding to the synchronization signal.

607. The base station sends a message 4 to the terminal.

If the base station successfully detects Msg.3, the base station sends a contention resolution message, to be specific, the message 4 (Message 4, Msg.4) to the terminal. Then, the terminal continues a subsequent procedure. If the terminal fails to detect Msg.3, the terminal returns to step 204.

In this embodiment, the terminal does not need to explicitly indicate, in Msg.3, the second uplink subcarrier spacing supported by the terminal to the base station. Therefore, a bit in Msg.3 is saved.

It should be noted that, in the foregoing embodiment, the present invention is described in detail by using an example in which the synchronization signals are classified into at least two groups, and each group corresponds to one type of uplink subcarrier spacing. However, the present invention is not limited to this. In another feasible implementation, each group may correspond to a combination of one type of uplink subcarrier spacing and an uplink transmission mode. For example, when each group corresponds to a combination of one type of uplink subcarrier spacing and an uplink transmission mode, the first group is a group corresponding to a combination of the first uplink subcarrier spacing and an uplink transmission mode, and the uplink transmission mode includes single-tone transmission or multi-tone transmission. For another example, when each group corresponds to a combination of one type of uplink subcarrier spacing and an uplink transmission mode, the first group is a group corresponding to a combination of the first uplink subcarrier spacing and an uplink transmission mode, and the uplink transmission mode includes single-tone transmission or multi-tone transmission.

Figure 10:
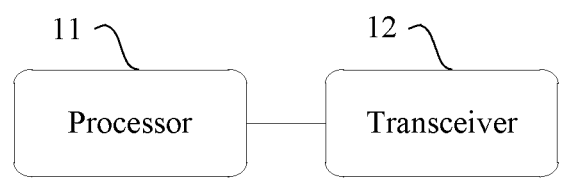
FIG. 10 is a schematic structural diagram of a base station according to Embodiment 1 of the present invention.

FIG. 10 is a schematic structural diagram of a base station according to Embodiment 1 of the present invention. The base station provided in this embodiment may implement steps of the method applied to the base station and provided in any embodiment of the present invention. A specific implementation process is not described herein. Specifically, the base station provided in this embodiment includes:

a processor 11, configured to determine indication information that is used to indicate a first uplink subcarrier spacing, where the first uplink subcarrier spacing is an uplink subcarrier spacing supported by the base station; and a transceiver 12, configured to communicate with a terminal according to the indication information determined by the processor 11.

According to the base station provided in this embodiment of the present invention, the base station determines the indication information that is used to indicate the first uplink subcarrier spacing supported by the base station, and communicates with the terminal according to the indication information. During the communication, the base station indicates the first uplink subcarrier spacing supported by the base station to the terminal, so that the terminal subsequently determines, based on the first uplink subcarrier spacing, a second uplink subcarrier spacing supported by the terminal; or the base station receives information that is sent by the terminal and that carries a second uplink subcarrier spacing, in other words, receives an indication from the terminal, so as to learn of the first uplink subcarrier spacing supported by the terminal or to be used by the terminal to send an uplink signal, or the terminal indicates the second uplink subcarrier spacing supported by the terminal to the base station. In this uplink subcarrier spacing indication process, the base station indicates the first uplink subcarrier spacing supported by the base station to the terminal, or the terminal indicates the second uplink subcarrier spacing supported by the terminal to the base station, so that the terminal uses an appropriate uplink subcarrier spacing to send an uplink signal in a subsequent uplink signal sending process, and the base station can correctly demodulate the uplink signal sent by the terminal.

Optionally, in an embodiment of the present invention, the processor 11 is specifically configured to classify physical random access preamble sequences into at least two groups, where each group corresponds to one type of uplink subcarrier spacing, the indication information includes group information of a physical random access preamble sequence corresponding to a first group in the at least two groups, and the first group is a group corresponding to the first uplink subcarrier spacing; or the processor 11 is specifically configured to classify physical random access preamble sequences into at least three groups, where each group corresponds to a combination of one type of uplink subcarrier spacing and an uplink transmission mode, the indication information includes group information of a physical random access preamble sequence corresponding to a first group in the at least three groups, the first group is a group corresponding to a combination of the first uplink subcarrier spacing and an uplink transmission mode, and the uplink transmission mode includes single-tone transmission or multi-tone transmission.

Optionally, in an embodiment of the present invention, the processor 11 is specifically configured to classify PRACH signals in different formats into at least two groups based on PRACH signal formats, where the PRACH signal formats are determined based on at least one of the following parameters: a cyclic prefix CP length of the PRACH signal, a subcarrier spacing of the PRACH signal, and a repetition period of the PRACH signal, each group corresponds to one type of uplink subcarrier spacing, the indication information includes a PRACH signal format corresponding to a first group in the at least two groups, and the first group is a group corresponding to the first uplink subcarrier spacing; or the processor 11 is specifically configured to classify PRACH signals in different formats into at least three groups based on PRACH signal formats, where the PRACH signal formats are determined based on at least one of the following parameters: a cyclic prefix CP length of the PRACH signal, a subcarrier spacing of the PRACH signal, and a repetition period of the PRACH signal, each group corresponds to a combination of one type of uplink subcarrier spacing and an uplink transmission mode, the indication information includes a PRACH signal format corresponding to a first group in the at least three groups, the first group is a group corresponding to a combination of the first uplink subcarrier spacing and an uplink transmission mode, and the uplink transmission mode includes single-tone transmission or multi-tone transmission.

Optionally, in an embodiment of the present invention, the processor 11 is specifically configured to classify PRACH channel resource pools into at least two resource pools, where each resource pool corresponds to one type of uplink subcarrier spacing, the indication information includes configuration information of a first resource pool in the at least two resource pools, and the first resource pool is a resource pool corresponding to the first uplink subcarrier spacing; or processor 11 is specifically configured to classify PRACH channel resource pools into at least three resource pools, where each resource pool corresponds to a combination of one type of uplink subcarrier spacing and an uplink transmission mode, the indication information includes configuration information of a first resource pool in the at least three resource pools, the first resource pool is a resource pool corresponding to a combination of the first uplink subcarrier spacing and an uplink transmission mode, and the uplink transmission mode includes single-tone transmission or multi-tone transmission.

Optionally, in an embodiment of the present invention, the processor 11 is specifically configured to configure a correspondence between an operation mode and an uplink subcarrier spacing, where the indication information includes an operation mode corresponding to the first uplink subcarrier spacing; or the processor 11 is specifically configured to configure a correspondence between an operation mode and a combination manner, where the combination manner is a combination of an uplink subcarrier spacing and an uplink transmission mode, the uplink transmission mode includes single-tone transmission or multi-tone transmission, and the indication information includes an operation mode corresponding to a combination of the first uplink subcarrier spacing and an uplink transmission mode.

Optionally, in an embodiment of the present invention, the transceiver 12 is specifically configured to send the indication information to the terminal.

Optionally, in an embodiment of the present invention, the transceiver 12 is specifically configured to: when the processor determines, according to the indication information, that the base station supports at least one first uplink subcarrier spacing, receive a scheduling transmission message that is sent by the terminal and carries a second uplink subcarrier spacing, where the second uplink subcarrier spacing is an uplink subcarrier spacing supported by the terminal and is one of the at least one first uplink subcarrier spacing.

Optionally, in an embodiment of the present invention, the transceiver 12 is specifically configured to: when the processor determines, according to the indication information, that the base station supports at least one first uplink subcarrier spacing, receive a terminal category message that is sent by the terminal and carries a second uplink subcarrier spacing, where the second uplink subcarrier spacing is an uplink subcarrier spacing supported by the terminal and is one of the at least one first uplink subcarrier spacing.

Optionally, in an embodiment of the present invention, the transceiver 12 is specifically configured to: when the processor determines, according to the indication information, that the base station supports at least one first uplink subcarrier spacing and the processor determines a second uplink subcarrier spacing, send, to the terminal, a radio resource control RRC message carrying the second uplink subcarrier spacing, where the second uplink subcarrier spacing is an uplink subcarrier spacing supported by the terminal and is one of the at least one first uplink subcarrier spacing.

Optionally, in an embodiment of the present invention, the processor 11 is specifically configured to determine the indication information based on a default configuration, where the default configuration is classifying synchronization signals into at least two groups, the synchronization signals include a primary synchronization signal and/or a secondary synchronization signal, each group corresponds to one type of uplink subcarrier spacing, the indication information includes a synchronization signal corresponding to a first group in the at least two groups, and the first group is a group corresponding to the first uplink subcarrier spacing; or the processor 11 is specifically configured to determine the indication information based on a default configuration, where the default configuration is classifying synchronization signals into at least three groups, the synchronization signals include a primary synchronization signal and/or a secondary synchronization signal, each group corresponds to a combination of one type of uplink subcarrier spacing and an uplink transmission mode, the indication information includes a synchronization signal corresponding to a first group in the at least three groups, the first group is a group corresponding to a combination of the first uplink subcarrier spacing and an uplink transmission mode, and the uplink transmission mode includes single-tone transmission or multi-tone transmission; and the transceiver 12 is specifically configured to send the synchronization signal corresponding to the first group to the terminal according to the indication information.

Optionally, in an embodiment of the present invention, the processor 11 is specifically configured to determine the indication information based on a default configuration, where the default configuration is classifying different time intervals between two consecutive synchronization signals into at least two groups based on time interval lengths between two consecutive synchronization signals, the synchronization signals include a primary synchronization signal and/or a secondary synchronization signal, each group corresponds to one time interval length, the indication information includes a synchronization signal with a time interval corresponding to a first group in the at least two groups, and the first group is a group corresponding to the first uplink subcarrier spacing; or the processor 11 is specifically configured to determine the indication information based on a default configuration, where the default configuration is classifying different time intervals between two consecutive synchronization signals into at least three groups based on time interval lengths between two consecutive synchronization signals, the synchronization signals include a primary synchronization signal and/or a secondary synchronization signal, each group corresponds to a combination of one type of uplink subcarrier spacing and an uplink transmission mode, the indication information includes a synchronization signal with a time interval corresponding to a first group in the at least three groups, the first group is a group corresponding to a combination of the first uplink subcarrier spacing and an uplink transmission mode, and the uplink transmission mode includes single-tone transmission or multi-tone transmission; and the transceiver 12 is specifically configured to send the synchronization signal corresponding to the first group to the first terminal according to the indication information.

Figure 11:
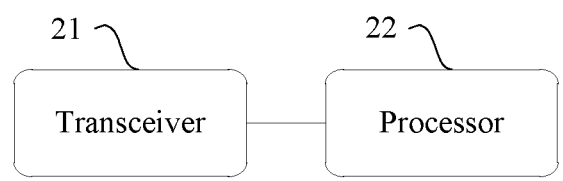
FIG. 11 is a schematic structural diagram of a terminal according to Embodiment 1 of the present invention.

FIG. 11 is a schematic structural diagram of a terminal according to Embodiment 1 of the present invention. The terminal provided in this embodiment may implement steps of the method applied to the terminal and provided in any embodiment of the present invention. A specific implementation process is not described herein. Specifically, the terminal provided in this embodiment includes:

a transceiver 21, configured to communicate with a base station, where the communication is that the base station communicates with the terminal according to indication information, the indication information is used to indicate a first uplink subcarrier spacing, and the first uplink subcarrier spacing is an uplink subcarrier spacing supported by the base station; and a processor 22, configured to perform processing based on the communication performed by the transceiver 21.

The terminal provided in this embodiment of the present invention communicates with the base station and performs the corresponding processing based on the communication. During the communication, the terminal receives the indication information that is used to indicate the first uplink subcarrier spacing and sent by the base station, in other words, receives an indication from the base station, so that the base station indicates the first uplink subcarrier spacing supported by the base station to the terminal; or the terminal indicates a second uplink subcarrier spacing supported by the terminal to the base station, so that the terminal indicates the second uplink subcarrier spacing supported by the terminal to the base station, and the terminal uses an appropriate uplink subcarrier spacing to send an uplink signal in a subsequent uplink signal sending process, thereby ensuring that the base station can correctly demodulate the uplink signal sent by the terminal.

Optionally, in an embodiment of the present invention, the transceiver 21 is specifically configured to receive the indication information sent by the base station, where the indication information includes group information of a physical random access preamble sequence corresponding to a first group when the base station classifies physical random access preamble sequences into at least two groups, and the first group is a group corresponding to the first uplink subcarrier spacing when each of the at least two groups corresponds to one type of uplink subcarrier spacing; or the indication information includes group information of a physical random access preamble sequence corresponding to a first group when the base station classifies physical random access preamble sequences into at least three groups, the first group is a group corresponding to a combination of the first uplink subcarrier spacing and an uplink transmission mode when each of the at least three groups corresponds to a combination of one type of uplink subcarrier spacing and an uplink transmission mode, and the uplink transmission mode includes single-tone transmission or multi-tone transmission.

Optionally, in an embodiment of the present invention, the transceiver 21 is specifically configured to receive the indication information sent by the base station, where the indication information includes a PRACH signal format corresponding to a first group when the base station classifies PRACH signals in different formats into at least two groups based on PRACH signal formats, the PRACH signal formats are determined based on at least one of the following parameters: a cyclic prefix CP length of the PRACH signal, a subcarrier spacing of the PRACH signal, and a repetition period of the PRACH signal, and the first group is a group corresponding to the first uplink subcarrier spacing when each of the at least two groups corresponds to one type of uplink subcarrier spacing; or the indication information includes a PRACH signal format corresponding to a first group when the base station classifies PRACH signals in different formats into at least three groups based on PRACH signal formats, the PRACH signal formats are determined based on at least one of the following parameters: a cyclic prefix CP length of the PRACH signal, a subcarrier spacing of the PRACH signal, and a repetition period of the PRACH signal, the first group is a group corresponding to a combination of the first uplink subcarrier spacing and an uplink transmission mode when each of the at least three groups corresponds to a combination of one type of uplink subcarrier spacing and an uplink transmission mode, and the uplink transmission mode includes single-tone transmission or multi-tone transmission.

Optionally, in an embodiment of the present invention, the transceiver 21 is specifically configured to receive the indication information sent by the base station, where the indication information includes configuration information of a first resource pool when the base station classifies PRACH channel resource pools into at least two resource pools, and the first resource pool is a resource pool corresponding to the first uplink subcarrier spacing when each of the at least two resource pools corresponds to one type of uplink subcarrier spacing; or the indication information includes configuration information of a first resource pool when the base station classifies PRACH channel resource pools into at least three resource pools, the first resource pool is a resource pool corresponding to a combination of the first uplink subcarrier spacing and an uplink transmission mode when each of the at least three resource pools corresponds to a combination of one type of uplink subcarrier spacing and an uplink transmission mode, and the uplink transmission mode includes single-tone transmission or multi-tone transmission.

Optionally, in an embodiment of the present invention, the transceiver 21 is specifically configured to receive the indication information sent by the base station, where the indication information includes an operation mode corresponding to the first uplink subcarrier spacing when the base station configures a correspondence between an operation mode and an uplink subcarrier spacing; or the indication information includes an operation mode corresponding to a combination of the first uplink subcarrier spacing and an uplink transmission mode when the base station configures a correspondence between an operation mode and a combination manner of an uplink subcarrier spacing and an uplink transmission mode.

Optionally, in an embodiment of the present invention, the processor 22 is specifically configured to: determine, according to the indication information, the first uplink subcarrier spacing supported by the base station; determine, according to the indication information, whether the first uplink subcarrier spacing is included in at least one second uplink subcarrier spacing supported by the terminal; and if yes, send an uplink signal to the base station, or otherwise, research for a cell.

Optionally, in an embodiment of the present invention, the processor 22 is specifically configured to send an instruction to the transceiver when the base station determines, according to the indication information, that there is at least one first uplink subcarrier spacing, so that the transceiver sends a scheduling transmission message to the base station, where the scheduling transmission message carries a second uplink subcarrier spacing, and the second uplink subcarrier spacing is an uplink subcarrier spacing supported by the terminal and is one of the at least one first uplink subcarrier spacing.

Optionally, in an embodiment of the present invention, the processor 22 is specifically configured to send an instruction to the transceiver when the base station determines, according to the indication information, that there is at least one first uplink subcarrier spacing, so that the transceiver sends a terminal category message to the base station, where the terminal category message carries a second uplink subcarrier spacing, and the second uplink subcarrier spacing is an uplink subcarrier spacing supported by the terminal and is one of the at least one first uplink subcarrier spacing.

Optionally, in an embodiment of the present invention, the processor 22 is specifically configured to send an instruction to the transceiver when the base station determines, according to the indication information, that there is at least one first uplink subcarrier spacing, so that the transceiver receives a radio resource control RRC message that is sent by the base station and that carries a second uplink subcarrier spacing, where the second uplink subcarrier spacing is an uplink subcarrier spacing supported by the terminal and is one of the at least one first uplink subcarrier spacing.

Optionally, in an embodiment of the present invention, the transceiver 21 is specifically configured to receive a synchronization signal sent by the base station according to the indication information, where the indication information includes a synchronization signal corresponding to a first group when the base station classifies synchronization signals into at least two groups based on a default configuration and each group corresponds to one type of uplink subcarrier spacing, and the first group is a group corresponding to the first uplink subcarrier spacing; or the indication information includes a synchronization signal corresponding to a first group when the base station classifies synchronization signals into at least three groups based on a default configuration and each group corresponds to a combination of one type of uplink subcarrier spacing and an uplink transmission mode, the first group is a group corresponding to a combination of the first uplink subcarrier spacing and an uplink transmission mode, and the uplink transmission mode includes single-tone transmission or multi-tone transmission.

Optionally, in an embodiment of the present invention, the transceiver 21 is specifically configured to receive a synchronization signal sent by the base station according to the indication information, where the indication information includes a synchronization signal corresponding to a first group when the base station classifies different time intervals between two consecutive synchronization signals into at least two groups based on time interval lengths between two consecutive synchronization signals and each group corresponds to one time interval length, and the first group is a group corresponding to the first uplink subcarrier spacing; or the indication information includes a synchronization signal corresponding to a first group when the base station classifies different time intervals between two consecutive synchronization signals into at least three groups based on time interval lengths between two consecutive synchronization signals and each group corresponds to a combination of one type of uplink subcarrier spacing and an uplink transmission mode, the first group is a group corresponding to a combination of the first uplink subcarrier spacing and an uplink transmission mode, and the uplink transmission mode includes single-tone transmission or multi-tone transmission.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An uplink subcarrier spacing indication method, comprising:
   determining, by a base station, indication information that indicates a first uplink subcarrier spacing, wherein the first uplink subcarrier spacing is an uplink subcarrier spacing supported by the base station, and the first uplink subcarrier spacing is used by the base station to receive a message-3 in a random access process; and
   communicating, by the base station, the indication information to a terminal.

2. The method according to claim 1, wherein the determining, by the base station, indication information comprises:
   classifying, by the base station, physical random access preamble sequences into at least two groups, wherein each group corresponds to one type of uplink subcarrier spacing, the indication information comprises group information of a physical random access preamble sequence corresponding to a first group in the at least two groups, and the first group is a group corresponding to the first uplink subcarrier spacing; or
   classifying, by the base station, physical random access preamble sequences into at least three groups, wherein each group corresponds to a combination of one type of uplink subcarrier spacing and an uplink transmission mode, the indication information comprises group information of a physical random access preamble sequence corresponding to a first group in the at least three groups, the first group is a group corresponding to a combination of the first uplink subcarrier spacing and an uplink transmission mode, and the uplink transmission mode comprises single-tone transmission or multi-tone transmission.

3. The method according to claim 1, wherein the determining, by the base station, indication information comprises:
   classifying, by the base station, Physical Random Access Channel (PRACH) signals in different formats into at least two groups based on PRACH signal formats, wherein the PRACH signal formats are determined based on at least one of the following parameters: a cyclic prefix (CP) length of the PRACH signal, a subcarrier spacing of the PRACH signal, or a repetition period of the PRACH signal, each group corresponds to one type of uplink subcarrier spacing, the indication information comprises a PRACH signal format corresponding to a first group in the at least two groups, and the first group is a group corresponding to the first uplink subcarrier spacing; or classifying, by the base station, PRACH signals in different formats into at least three groups based on PRACH signal formats, wherein the PRACH signal formats are determined based on at least one of the following parameters: a cyclic prefix (CP) length of the PRACH signal, a subcarrier spacing of the PRACH signal, or a repetition period of the PRACH signal, each group corresponds to a combination of one type of uplink subcarrier spacing and an uplink transmission mode, the indication information comprises a PRACH signal format corresponding to a first group in the at least three groups, the first group is a group corresponding to a combination of the first uplink subcarrier spacing and an uplink transmission mode, and the uplink transmission mode comprises single-tone transmission or multi-tone transmission.

4. The method according to claim 1, wherein the determining, by the base station, indication information comprises:

classifying, by the base station, PRACH channel resource pools into at least two resource pools, wherein each resource pool corresponds to one type of uplink subcarrier spacing, the indication information comprises configuration information of a first resource pool in the at least two resource pools, and the first resource pool is a resource pool corresponding to the first uplink subcarrier spacing; or classifying, by the base station, PRACH channel resource pools into at least three resource pools, wherein each resource pool corresponds to a combination of one type of uplink subcarrier spacing and an uplink transmission mode, the indication information comprises configuration information of a first resource pool in the at least three resource pools, the first resource pool is a resource pool corresponding to a combination of the first uplink subcarrier spacing and an uplink transmission mode, and the uplink transmission mode comprises single-tone transmission or multi-tone transmission.

5. The method according to claim 2, wherein the communicating, by the base station, the indication information to a terminal comprises:

sending, by the base station, the indication information to the terminal.

6. The method according to claim 1, wherein the communicating, by the base station, the indication information to a terminal comprises:

determining, by the base station according to the indication information, that the base station supports at least one first uplink subcarrier spacing; and receiving, by the base station, a terminal category message that is sent by the terminal, wherein the terminal category message carries a second uplink subcarrier spacing, the second uplink subcarrier spacing is an uplink subcarrier spacing supported by the terminal, and the second uplink subcarrier spacing is one of the at least one first uplink subcarrier spacing.

7. The method according to claim 1, wherein the communicating, by the base station, the indication information to a terminal comprises:

determining, by the base station according to the indication information, that the base station supports at least one first uplink subcarrier spacing;

determining, by the base station, a second uplink subcarrier spacing, wherein the second uplink subcarrier spacing is an uplink subcarrier spacing supported by the terminal, and the second uplink subcarrier spacing is one of the at least one first uplink subcarrier spacing; and sending, by the base station to the terminal, a radio resource control (RRC) message carrying the second uplink subcarrier spacing.

8. A base station, comprising:

a processor, configured to determine indication information that indicates a first uplink subcarrier spacing, wherein the first uplink subcarrier spacing is an uplink subcarrier spacing supported by the base station, and the first uplink subcarrier spacing is used to receive a message-3 in a random access process; and a transceiver, configured to communicate the indication information to a terminal.

9. The base station according to claim 8, wherein the processor is configured to classify physical random access preamble sequences into at least two groups, wherein each group corresponds to one type of uplink subcarrier spacing, the indication information comprises group information of a physical random access preamble sequence corresponding to a first group in the at least two groups, and the first group is a group corresponding to the first uplink subcarrier spacing; or the processor is configured to classify physical random access preamble sequences into at least three groups, wherein each group corresponds to a combination of one type of uplink subcarrier spacing and an uplink transmission mode, the indication information comprises group information of a physical random access preamble sequence corresponding to a first group in the at least three groups, the first group is a group corresponding to a combination of the first uplink subcarrier spacing and an uplink transmission mode, and the uplink transmission mode comprises single-tone transmission or multi-tone transmission.

10. The base station according to claim 8, wherein the processor is configured to classify Physical Random Access Channel (PRACH) PRACH signals in different formats into at least two groups based on PRACH signal formats, wherein the PRACH signal formats are determined based on at least one of the following parameters: a cyclic prefix (CP) length of the PRACH signal, a subcarrier spacing of the PRACH signal, or a repetition period of the PRACH signal, each group corresponds to one type of uplink subcarrier spacing, the indication information comprises a PRACH signal format corresponding to a first group in the at least two groups, and the first group is a group corresponding to the first uplink subcarrier spacing; or the processor is configured to classify PRACH signals in different formats into at least three groups based on PRACH signal formats, wherein the PRACH signal formats are determined based on at least one of the following parameters: a cyclic prefix (CP) length of the PRACH signal, a subcarrier spacing of the PRACH signal, or a repetition period of the PRACH signal, each group corresponds to a combination of one type of uplink subcarrier spacing and an uplink transmission mode, the indication information comprises a PRACH signal format corresponding to a first group in the at least three groups, the first group is a group corresponding to a combination of the first uplink subcarrier spacing and an uplink transmission mode, and the uplink transmission mode comprises single-tone transmission or multi-tone transmission.

11. The base station according to claim 8, wherein
the processor is configured to classify PRACH channel resource pools into at least two resource pools, wherein each resource pool corresponds to one type of uplink subcarrier spacing, the indication information comprises configuration information of a first resource pool in the at least two resource pools, and the first resource pool is a resource pool corresponding to the first uplink subcarrier spacing; or
the processor is configured to classify PRACH channel resource pools into at least three resource pools, wherein each resource pool corresponds to a combination of one type of uplink subcarrier spacing and an uplink transmission mode, the indication information comprises configuration information of a first resource pool in the at least three resource pools, the first resource pool is a resource pool corresponding to a combination of the first uplink subcarrier spacing and an uplink transmission mode, and the uplink transmission mode comprises single-tone transmission or multi-tone transmission.

12. The base station according to claim 9, wherein
the transceiver is configured to send the indication information to the terminal.

13. The base station according to claim 8, wherein
the processor is configured to determine, according to the indication information, that the base station supports at least one first uplink subcarrier spacing; and
the transceiver is configured to: receive a terminal category message that is sent by the terminal, wherein the terminal category message carries a second uplink subcarrier spacing, the second uplink subcarrier spacing is an uplink subcarrier spacing supported by the terminal, and the second uplink subcarrier spacing is one of the at least one first uplink subcarrier spacing.

14. The base station according to claim 8, wherein
the processor is configured to
determine, according to the indication information, that the base station supports at least one first uplink subcarrier spacing; and
determine a second uplink subcarrier spacing, and wherein the second uplink subcarrier spacing is an uplink subcarrier spacing supported by the terminal, and the second uplink subcarrier spacing is one of the at least one first uplink subcarrier spacing; and
the transceiver is configured to: send, to the terminal, a radio resource control (RRC) message carrying the second uplink subcarrier spacing.

15. A terminal, comprising:
a transceiver, configured to receive indication information from a base station, wherein the indication information indicates a first uplink subcarrier spacing, the first uplink subcarrier spacing is an uplink subcarrier spacing supported by the base station, and the first uplink subcarrier spacing is used to transmit a message-3 in a random access process; and
a processor, configured to process communication with the base station.

16. The terminal according to claim 15, wherein
the transceiver is configured to receive the indication information sent by the base station, wherein
the indication information comprises group information of a physical random access preamble sequence corresponding to a first group when the base station classifies physical random access preamble sequences into at least two groups, and the first group is a group corresponding to the first uplink subcarrier spacing when each of the at least two groups corresponds to one type of uplink subcarrier spacing; or
the indication information comprises group information of a physical random access preamble sequence corresponding to a first group when the base station classifies physical random access preamble sequences into at least three groups, the first group is a group corresponding to a combination of the first uplink subcarrier spacing and an uplink transmission mode when each of the at least three groups corresponds to a combination of one type of uplink subcarrier spacing and an uplink transmission mode, and the uplink transmission mode comprises single-tone transmission or multi-tone transmission.

17. The terminal according to claim 15, wherein
the transceiver is configured to receive the indication information sent by the base station, wherein
the indication information comprises a Physical Random Access Channel (PRACH) signal format corresponding to a first group when the base station classifies PRACH signals in different formats into at least two groups based on PRACH signal formats, the PRACH signal formats are determined based on at least one of the following parameters: a cyclic prefix (CP) length of the PRACH signal, a subcarrier spacing of the PRACH signal, and a repetition period of the PRACH signal, or the first group is a group corresponding to the first uplink subcarrier spacing when each of the at least two groups corresponds to one type of uplink subcarrier spacing; or
the indication information comprises a PRACH signal format corresponding to a first group when the base station classifies PRACH signals in different formats into at least three groups based on PRACH signal formats, the PRACH signal formats are determined based on at least one of the following parameters: a cyclic prefix (CP) length of the PRACH signal, a subcarrier spacing of the PRACH signal, or a repetition period of the PRACH signal, the first group is a group corresponding to a combination of the first uplink subcarrier spacing and an uplink transmission mode when each of the at least three groups corresponds to a combination of one type of uplink subcarrier spacing and an uplink transmission mode, and the uplink transmission mode comprises single-tone transmission or multi-tone transmission.

18. The terminal according to claim 15, wherein
the transceiver is configured to receive the indication information sent by the base station, wherein
the indication information comprises configuration information of a first resource pool when the base station classifies PRACH channel resource pools into at least two resource pools, and the first resource pool is a resource pool corresponding to the first uplink subcarrier spacing when each of the at least two resource pools corresponds to one type of uplink subcarrier spacing; or the indication information comprises configuration information of a first resource pool when the base station classifies PRACH channel resource pools into at least three resource pools, the first resource pool is a resource pool corresponding to a combination of the first uplink subcarrier spacing and an uplink transmission mode when each of the at least three resource pools corresponds to a combination of one type of uplink subcarrier spacing and an uplink transmission mode, and the uplink transmission mode comprises single-tone transmission or multi-tone transmission.

19. The terminal according to claim 16, wherein the processor is configured to:
    determine, according to the indication information, the first uplink subcarrier spacing supported by the base station;
    determine, according to the indication information, whether the first uplink subcarrier spacing is comprised in at least one second uplink subcarrier spacing supported by the terminal; and
    if the first uplink subcarrier spacing is determined to be included in at least one second uplink subcarrier spacing, the transceiver is configured to send an uplink signal to the base station, or
    if the first uplink subcarrier spacing is determined to be not included in the second uplink subcarrier spacing, the processor is configured to research for a cell.

20. The terminal according to claim 15, wherein the transceiver is configured to receive a radio resource control (RRC) message that is sent by the base station, wherein the RRC message carries a second uplink subcarrier spacing, the second uplink subcarrier spacing is an uplink subcarrier spacing supported by the terminal, and the second uplink subcarrier spacing is one of at least one first uplink subcarrier spacing determined by the base station according to the indication information.

* * * * *